US012786142B2

(12) United States Patent
Muthigi et al.

(10) Patent No.: US 12,786,142 B2
(45) Date of Patent: Nov. 3, 2026

(54) COMMUNICATING DATA AND COMMAND MESSAGES AND POINT-TO-POINT SIGNALING USING A MULTI-BIT LINE NETWORK-ON-CHIP

(71) Applicant: QUALCOMM Incorporated, San Diego, CA (US)

(72) Inventors: Venkatesh Murthy Muthigi, Bengaluru (IN); Christophe Avoinne, San Diego, CA (US); Abhishek Dilip Sakharwade, Bangalore (IN); Dhruvir Gandhi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 365 days.

(21) Appl. No.: 18/636,544

(22) Filed: Apr. 16, 2024

(65) Prior Publication Data

US 2025/0323878 A1 Oct. 16, 2025

(51) Int. Cl.
*H04L 49/109* (2022.01)
*H04L 47/6275* (2022.01)

(52) U.S. Cl.
CPC ........ *H04L 49/109* (2013.01); *H04L 47/6275* (2013.01)

(58) Field of Classification Search
CPC .......................... H04L 49/109; H04L 47/6275
See application file for complete search history.

(56) References Cited

U.S. PATENT DOCUMENTS

| | | | | |
|---|---|---|---|---|
| 11,496,418 | B1 * | 11/2022 | Blair | H04L 49/15 |
| 2016/0182256 | A1 * | 6/2016 | Anders | H04L 41/02<br>370/352 |
| 2019/0266089 | A1 * | 8/2019 | Kumar | G06F 12/0811 |
| 2022/0015588 | A1 * | 1/2022 | Mccolgan | A47K 11/02 |
| 2023/0291405 | A1 * | 9/2023 | Ahmad | H03K 19/17728 |

* cited by examiner

*Primary Examiner* — Austin J Moreau
(74) *Attorney, Agent, or Firm* — MUNCY, GEISSLER, OLDS & LOWE, P.C.

(57) ABSTRACT

Various embodiments include methods for communicating data, commands, and point-to-point signaling between hardware components using a multi-bit line network on chip (NOC) on a system on chip (SoC). Various embodiments may include transmitting signals, data, and command messages over the NOC during communication time slots that are divided into signal transfer intervals and packet transfer intervals. With the communication time slots divided in this manner, the NOC may be used for point-to-point signaling during signal transfer intervals and used to transmit packetized data or commands from transmitting components or subsystems to receiving components or subsystems of the NOC during packet transfer intervals. Point-to-point signaling may be multiplexed onto one or more of the NOC bit lines, enabling transmission of several signals during each signal transfer interval on any one or more of the bit lines.

20 Claims, 18 Drawing Sheets

COMMUNICATING DATA AND COMMAND MESSAGES AND POINT-TO-POINT SIGNALING USING A MULTI-BIT LINE NETWORK-ON-CHIP

BACKGROUND

Modern integrated circuit (IC) systems on chip (SoCs) encompassing multiple processors and subsystems, each made up of a large number of components, require the communication of a large number of signals between the various processors, subsystems, and components as well as communication of data and commands messages. Such signals are typically single bits of information, such as a voltage state (e.g., high or low), a voltage transition (e.g., high-to-low or low-to-high), a voltage pulse (e.g., low-to-high-to-low), that may be transmitted over a single wire between components to enable or disable a state or function of another component, communicate a state of components, acknowledge a state or function, and similar simple communications. In contrast, data and command communications require the transmission of one or more bytes of information between a range of processors, subsystems, and components. For such communications, packet switch networks may be deployed within and between major components on a SoC.

SUMMARY

Various aspects include methods and apparatuses for communicating data, commands, and point-to-point signaling between hardware components using a multi-bit line network on chip (NOC) on a system on chip (SoC). Various aspects may include transmitting signals, data, and command messages over the NOC during communication time slots that are divided into signal transfer intervals and packet transfer intervals, using the NOC during signal transfer intervals for point-to-point signaling, and using the NOC during packet transfer intervals to transmit packetized data or commands from transmitting components or subsystems to receiving components or subsystems. In some aspects, using the NOC during signal transfer intervals for point-to-point signaling may include using a multiplexer circuit to connect individual signaling components or subsystems to a selected bit line of the NOC wires for transmitting signals and using a demultiplexer circuit to connect the selected bit line of the NOC to a corresponding receiving component or subsystem.

Some aspects may further include receiving signals from a plurality of individual signaling components or subsystems, buffering signals received from the plurality of individual signaling components or subsystems during packet transfer intervals, and providing buffered and received signals to the multiplexer circuit during signal transfer intervals.

Some aspects may further include selecting by the multiplexer circuit one of the bit lines of the NOC for transmission of each signal at specific instances using a selection algorithm that is mirrored on the demultiplexer circuit to enable the demultiplexer circuit to select the same one of the bit lines of the NOC at the specific instances for reception of each signal.

In some aspects, using the NOC during the packet transfer interval to transmit packetized data or commands from transmitting components or subsystems to receiving subsystems or components may include receiving data or command messages from a plurality of individual messaging components or subsystems, buffering data or command messages received from the plurality of individual messaging components or subsystems during signal transfer intervals, and providing buffered and received data or command messages to a packetizer circuit during packet transfer intervals.

Some aspects may further include using a time-aware network clock to provide slot boundary marker signals and cycle marker signals to at least signal multiplexer, demultiplexer, aggregator, and segregator circuits to indicate the start and stop of signal transfer intervals and packet transfer intervals.

Some aspects may further include adjusting the packet transfer interval to meet command and data communication requirements for latency and bandwidth in the SoC. Some aspects may further include adjusting the signal transfer interval based on signaling latency and bandwidth requirements in the SoC.

Further aspects include a computing device including a NOC configured to perform operations of any of the methods summarized above. Further aspects include a NOC configured to perform operations of any of the methods summarized above. Further aspects include a computing device having means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
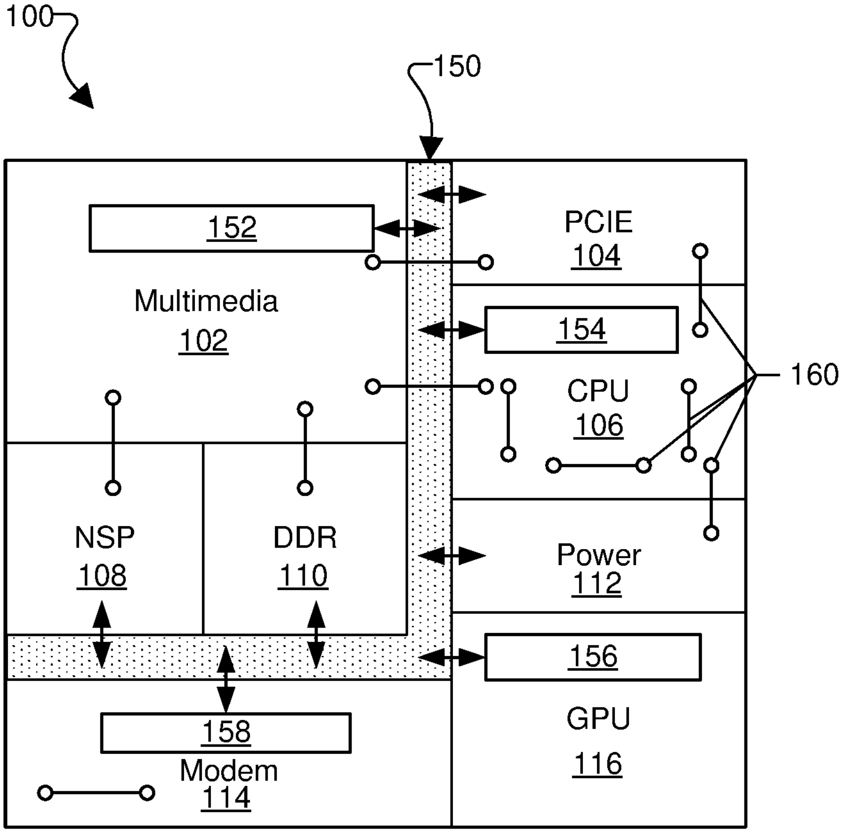
FIG. 1 is a conceptual block diagram of an example system on chip (SoC) illustrating networks on chip (NOCs) and point-to-point signaling connections.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and circuitry implementing such methods for communicating data, commands, and point-to-point signaling between hardware components using a multi-bit line network on chip (NOC) on a system on chip (SoC). Various embodiments include establishing communication time slots for the use of an NOC and dividing the communication time slots into signal transfer intervals and packet transfer intervals. During the signal transfer intervals, point-to-point signaling occurs via the NOC, while during packet transfer intervals, packetized data or commands are transmitted from transmitting components or subsystems to receiving components or subsystems. To enable point-to-point signaling, a multiplexer circuit may connect individual signaling components or subsystems (referred to as "clients") to a selected bit line of the NOC wires for transmission of signals, and a demultiplexer circuit may connect each selected bit line of the NOC to a corresponding receiving component or subsystem (client).

The term "system-on-chip" (SoC) is used herein to refer to a set of interconnected electronic circuits typically, but not exclusively, including a processing device, a memory, and a communication interface. A processing device may include a variety of different types of processors and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multi-core processor, a controller, and a microcontroller. A processing device may further embody other hardware and hardware combinations, such as a field programmable gate array (FPGA), an application-specific integrated circuit (ASIC), another programmable logic device, discrete gate logic, transistor logic, performance monitoring hardware, watchdog hardware, and time references. Integrated circuits may be configured such that the components of the integrated circuit reside on a single piece of semiconductor material, such as silicon.

Conventionally, point-to-point (sometimes abbreviated "P2P") connections or wires (e.g., conductive vias) are used for communicating control signals between hardware components on an SoC. Point-to-point signaling wires provide a direct connection between two components, allowing for efficient communication and control. This type of wiring is commonly used in SoC designs to ensure that the various hardware components can work together seamlessly. Conventionally, components connect with one another over a vast assortment of wires connecting components and running specific protocols per each service/control function. Communication handshakes typically involve individual wires sending voltage signals back and forth between hardware components. Some non-limiting examples of such signaling include interrupts from different sub-systems converging on to a processor (which may total 600-1000 wires in a modern SoC design); requests and acknowledgment handshakes between components; trigger signals to initiate a control function/data transfer, and event and/or error report signals; component or subsystem status or state indications; changes in state; readiness or availability of a component or subsystem; unavailability of a component or subsystem; and other informational signals or indications.

While using dedicated wires for such component-to-component signaling is effective in achieving direct signaling and control, such dedicated wires are underutilized in terms of their signal-carrying capacity. This is because many control signals, such as an interrupt signal, may occur once in a few microseconds; however, the wire dedicated to conveying that signal stays connected between the components (e.g., from a sub-system to the processor) all the time. The huge number of wires required to support component-to-component and subsystem-to-processor signaling incurs silicon area "cost" and poses challenges in physical design. Beyond accommodating the large number of wires to support the wide array of signals in an SoC, the physical design of the SoC must accommodate long-distance routing of such wires (e.g., 6 mm-20 mm) while supporting signal integrity, signal timing requirements (STA), meeting electrical design rule checks (DRC), and other design criteria.

A multi-bit line NOC is sometimes referred to as a "shared media network" because data and command messages are packetized with the data/command packets routed from the sending subsystem or component to the receiving subsystem or component. Data and command packets are routed by a NOC according to routing information (e.g., an address) included in each packet. The transmission of packetized data and commands via a NOC is efficient because the multiple-bit lines (e.g., 8, 16, 32, etc. bit lines) that make up the NOC data bus support parallel transmission of several bits (e.g., a byte) at a time. Such addressing and support for packets of various sizes enables a NOC to route any form of data and commands from one location on the SoC to another location or another SoC using the same data bus. Further, packet routing of data and commands over an NOC enables non-synchronous communications within and between SoC subsystems and components.

Multi-bit line NOCs enable efficient transmissions of large amounts of data and commands throughout an SoC and between SoCs over a limited number of bit-lines. However, the conventional design for NOCs does not enable their use for typical point-to-point signaling between components and subsystems. Encoding point-to-point signaling into data packets for transmission via a NOC may introduce added latency that can slow or interrupt critical operations of an SoC and may add to congestion on the NOC as each signal that could be communicated in a single clock cycle would require a dedicated packet spanning multiple clock cycles.

Various embodiments overcome design issues associated with direct point-to-point connections between SoC components and subsystems while maintaining the advantages of direct wire connections by using some or all of the bit lines of a multi-bit parallel wire NOC to provide point-to-point connections during a brief interval before (or after) an interval during which data packets are communicated over the NOC. By time-sharing individual bit lines of the NOC for point-to-point signaling during a first portion of time (referred to herein as a "signaling window" or "isochronous window") and communication of data and/or command packets during a second portion of time (referred to herein as a "packet transmission window" or "asynchronous window"), the number of signaling wires in an SoC design can be greatly reduced. By using circuit switch mechanisms to multiplex the transmission of signals over individual bit lines of the NOC and demultiplex signals for relaying to receiving components, the number of components and subsystems communicating signals over the NOC may exceed the number of wires or bit lines in the NOC bus.

Various embodiments enable time sharing of NOC bit wires for point-to-point and packet communications by dividing up the use of the NOC into communication time slots. Each NOC communication time slot of N cycles of defined duration (e.g., 5 nanoseconds) may be divided into a signal transfer interval or signaling window of K cycles followed by a packet transfer interval of M cycles. As non-limiting examples, the NOC communication time slot may encompass 128 clock cycles of 5 nanoseconds (ns) each for a duration of 640 ns, the signal transfer interval may encompass 16 cycles of those cycles for a duration of 80 ns, and the packet transfer interval may encompass 112 cycles for a duration of 560 ns. During the signal transfer interval, the bit wires of the NOC are made available to a circuit switch multiplexer circuit that connects individual signaling components/subsystems to selected bit wires of the NOC at time instances in synch with a circuit switch demultiplexer circuit on the other end of the NOC to route each signal to a corresponding receiving component/subsystem. During the packet transfer interval, the NOC is used to transmit packetized data or commands from data receiver and packetizer circuits on one end of the NOC to a packet decoder and data router circuits on the other end of the NOC.

To ensure synchronization and avoid time drift, the multiplexer, demultiplexer, data/command receiver, packetizer, and packet decoder circuits may be time-synchronized by a time-aware network, such as with signals from a network clock. Slot boundary marker signals and cycle marker signals may be provided to the multiplexer/demultiplexer, data/command receiver, and packetizer/depacketizer circuits for signaling the start and stop of signal transfer and packet transfer intervals, triggering the circuit switch and NOC packet routing circuits to switch between multiplexed P2P signaling and packetize data communications. As various embodiments may be implemented between or across separate chiplets and/or SoCs, network timing signals may be used to provide for inter-chiplet signal consolidation.

The signal routing circuitry may include a signal receiving and multiplexer circuit configured to connect each of a plurality of component and subsystem clients to one or more of the bit lines of the NOC, and a demultiplexer and signal routing circuit configured to connect one or more of the bit lines of the NOC to a respective receiving component or subsystem client. The signal receiving and multiplexer circuit may be configured to receive signals from a plurality of signaling component or subsystem clients for relay to corresponding receiving components or subsystems, select one of the bit lines of the NOC to carry the signal and connect the signal to the selected bit line at a transmission time synchronized with the demultiplexer and signal routing circuit. At the transmission time, the demultiplexer and signal routing circuit may receive a transmitted signal (e.g., voltage change, pulse, or level) and provide that signal to the corresponding component or subsystem client. Well-known technologies for multiplexing signal transitions over single wires may be used to synchronize signal transmissions and receptions between the multiplexer and demultiplexer with the added novelty that the multiplexer and demultiplexer circuits select and use one or all of the bit lines of a multi-bit NOC for signal transmissions. To accommodate the transmission of signals only during the signal transfer interval (signaling window), the signal receiving and multiplexer circuit may include temporary storage or buffering circuits to receive and store signals during the packet transfer interval until the signals can be transmitted during the next signal transfer interval.

The data/command receiver, packetizer, and packet decoder circuits may be coupled to a plurality of components and subsystems of the SoC, which may include some or all of the components and subsystems to which the signal receiving and multiplexer circuit and the demultiplexer and signal routing circuit are coupled. The data/command receiver may include temporary storage or buffering circuits to receive and store data and commands from various components or subsystems during the signal transfer interval until the data or commands can be transmitted in packets during the next packet transfer interval. The packetizer may receive data or command messages and encode them in one or more packets including suitable addressing and applying the packets to the NOC at transmission slots during the packet transfer interval. The packet decoder circuit may receive data and command packets from the NOC, extract the encoded data or command messages, and provide the data or command messages to the appropriate components or subsystem according to addressing in the received packets.

In some embodiments, the data/command receiver and the signal receiving and multiplexer circuit may be separate components. In some embodiments, the data/command receiver and the signal receiving and multiplexer circuit may share some elements (e.g., connections to components and subsystems) coupled to separate elements (e.g., multiplexer and data/command buffer). In some embodiments, the data/command receiver and the signal receiving and multiplexer circuit may be implemented as a single component or subsystem configured to perform both functions depending on the instant transfer interval.

Signals exchanged point-to-point over single wires may be characterized by a signal slot periodicity, which depends upon the signal pulse width required to communicate a signal to the receiving component. The pulse width and the duration of the signal transfer interval set an upper limit on how many separate signals can be sent over a given bit line during the signal transfer interval. The duration of the signal transfer interval (also referred to herein as an "isochronous window" or "signaling window"), and thus the number of signals that can be sent per bit line in the NOC during each interval for a given pulse width, may be determined or adjusted during the design phase as necessary to support signaling latency and bandwidth requirements in the SoC design. In some embodiments, the duration of the signal transfer interval may be adjusted during operation as necessary to support changing signaling latency and bandwidth requirements of operations on the SoC. Similarly, the duration of the packet transfer interval may be adjusted during the design phase or during operation to meet command and data communication requirements for latency and bandwidth in the SoC.

Various embodiments enable predictable and reliable signaling latency based on the wait time between NOC communication time slots, network transport delays, and uncertainty in signal reception. As a non-limiting example using the example cycle durations and cycle numbers in the signal transfer and packet transfer interval slots, the maximum wait time between signaling opportunities would be 560 ns, the network transport delay would be 80 ns plus wire delays, and the uncertainty would be approximately 30 ns due to transmission/receive circuit delay components plus two stages on the network at 5 ns per cycle. Thus, the total wait time for signals would be 670 to 700 ns in this non-limiting example.

Combining circuit switch technologies with packet routing NOC buses using time-sharing methods enables the plurality of bit wires (e.g., 8, 16, 32, etc.) of the NOC data bus to be shared for different unrelated functions (i.e., direct signaling vs. packet transmissions). This sharing of NOC wires for signaling may enable chip designers to reduce the number of wires on an SoC, thereby reducing shared wire costs, reducing silicon costs, and simplifying the physical design, which may reduce the non-recurring costs of chip design. Various embodiments may improve the efficiency and utilization of wires within an SoC by increasing the utilization of NOC bandwidth and reducing the number of underutilized dedicated signaling wires. By combining the best features of circuit-switched P2P communications with a packet-switching network to transport signals and data/command messages of different classes of traffic and different protocols over a shared network, various embodiments enable efficient signaling and communication of data and commands within and between major components with predictable latency and bandwidth.

FIG. 1 is a notional block diagram illustrating an example SoC 100 including a plurality of major components and networks and signal wires. For example, an SoC 100 may include several subsystems and computational cores, including for example a multimedia core 102, a central processing unit (CPU) core 106, a power infrastructure core 112, a memory core, such as a double data rate (DDR) memory core 110, a modem core 114, a graphics processing unit (GPU) core 116, a Neural Signal Processor (NSP) core 108, and a peripheral component interconnect express (PCIE) core 104 providing a standardized interface for motherboard components including graphics, memory, and storage. The major components may exchange data and commands via one or more networks on chip (NOCs) 150. Additionally, major components may include internal NOCs 152, 154, 156, 158 for exchanging data and commands between subsystems and components. Also, major components may include many point-to-point wire connections for communicating signals between different components on the same chip, such as voltage, frequency, clock, bandwidth, interrupts, and handshakes. Such signals are usually transmitted unidirectionally and have specific characteristics such as bandwidth, latency, and periodicity.

While FIG. 1 illustrates one NOC 150 between major components, there may be multiple such NOCs in a SoC, and not all NOCs included in a SoC 100 may be connected to one another. In some SoC designs, the NOCs 150 between major components may be parallel multiple-bit line networks that support data and command communications between major components using addressed packets. Similarly, components and subsystems within some major components (e.g., the CPU 106) may exchange data and commands using addressed packets transmitted via one or more NOCs 152, 154, 156, 158 within the major component.

In addition to data and command communications, components and subsystems within major components exchange signals for various control functions, which may be in the form of single pulses or changes in voltage states on single wires, such as interrupts, enable signals, disable signals, acknowledgments, and the like. Conventionally, electrical connections in the form of wires 160 or conducting vias are provided between subcomponents and devices to convey such signals point-to-point, which requires hundreds of conductive paths provided on the SoC. For example, wires conveying interrupts from various subsystems in a typical SoC may require 600 to 1000 wires converging onto a processor. In addition to interrupt signals, point-to-point wires are used for conveying function requests and handshakes, conveying trigger signals to initiate a control function or data transfer, and enabling event and error report signaling. The various signals carried over point-to-point signal wires involve different protocols, which may be specific to the service or control function supported or corresponding to each signal.

The information carried in packets over a NOC and the information carried in signals in point-to-point communications is very different, encoding information differently and involving different latency requirements.

Figure 2A:
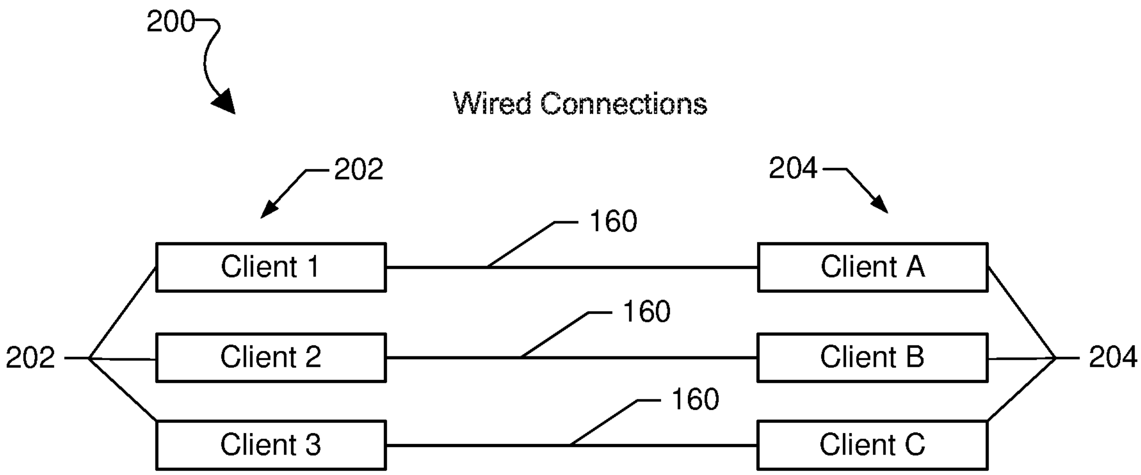
FIGS. 2A-2B are component block diagrams illustrating conventional structures for passing signals between components and subsystems.

FIG. 2A illustrates an example 200 of three point-to-point wire connections 160 between different clients 202, 204. With reference to FIGS. 1-2A, the clients 202, 204 in FIG. 2A may be any of a variety of different components and subsystems in a major component (e.g., 102-114) that need to exchange signals (e.g., interrupts, flags, requests, acknowledgments, event signals, error indications, etc.) Being direct wire connections, dedicated wires provide reliable minimal latency communications accommodating whatever protocol is used between the components/subsystems. However, such wires are underutilized in terms of signal carrying capacity because signals are typically brief and sporadic. For example, an interrupt may occur once in a few microseconds, but the wire has no other usage. A dedicated wire connection between components (e.g., between a sub-system and a processor) thus takes up valuable silicon area on the SoC that is utilized only a fraction of the time. Further, there are many design challenges involved in laying out the routing of hundreds of dedicated point-to-point wires over relatively long distances (e.g., 6-20 mm) while meeting the signal integrity, timing, and electrical design requirements, which adds to the non-recurring costs of designing and fabricating SoCs.

Figure 2B:
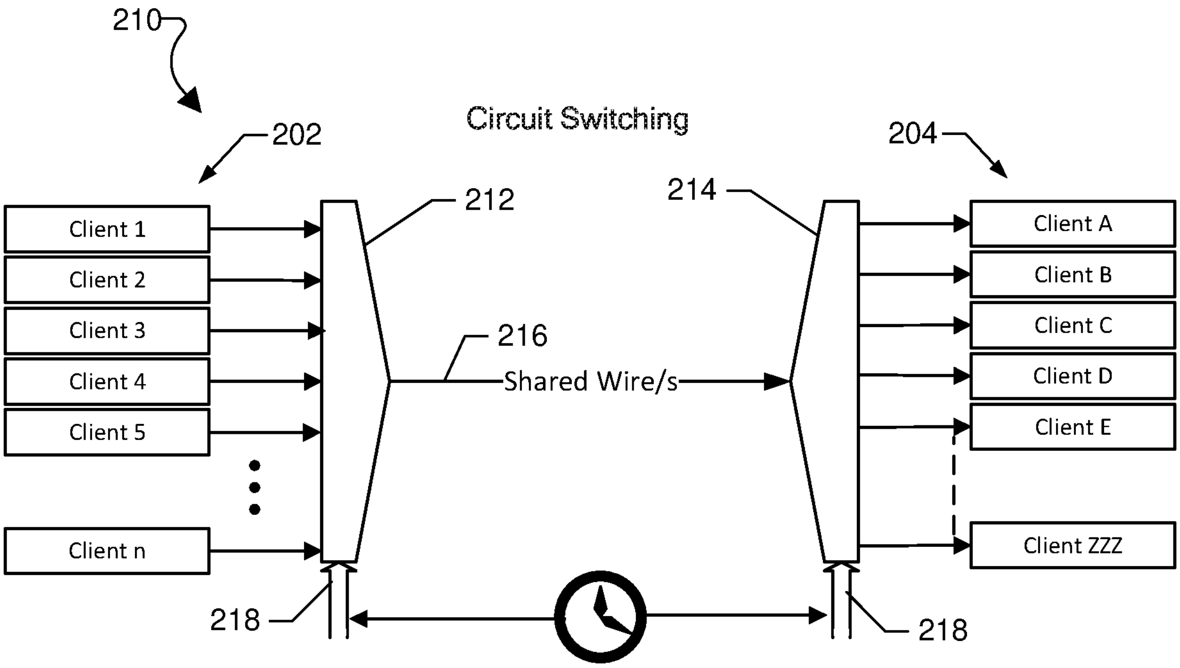

An alternative to multiple single wire point-to-point connects involves using multiplexing to send signals between various components over shared wires through time sharing in a circuit switching network, an example 210 of which is illustrated in FIG. 2B. As illustrated, using shared wires for communicating signals between multiple components 202, 204 (clients 1-N) may be accomplished by receiving signals from each component in a multiplexer circuit 212 that is configured to connect each transmitting component 202 (or transmit each signal) one at a time to a shared wire or wires 216 that transmit the sequence signals to a demultiplexer 214 that is configured to connect the shared wire/wires 216 (or convey each signal) to each receiving component 204. This transmission of multiple signals over one or a few wires may be accomplished by the multiplexer 212 and demultiplexer 214 connecting (i.e., circuit switching) clients 202, 204 to the shared wire/wires 216 approximately simultaneously for predetermined durations (such as one clock cycle).

Clock signals 218 may be provided to each of the multiplexer 212 and demultiplexer 214 to enable this synchronization.

Sharing one or a few wires using circuit switching networks may reduce the number of wires and the silicon area cost, save on SoC non-recurring design costs, better utilize wires on the SoC, and improve the predictability and reliability of signal delivery by using time slots and markers. However, these advantages come at a cost of added latency and variation in the signal delivery depending on the slot time and the network bandwidth, added requirements for global time synchronization, limiting components and subsystems (i.e., clients) to predetermined patterns of signal delivery that are preconfigured with the multiplexer and demultiplexer, and requirements for sideband signals for the markers and to avoid using the data lines for the markers.

Figure 2C:
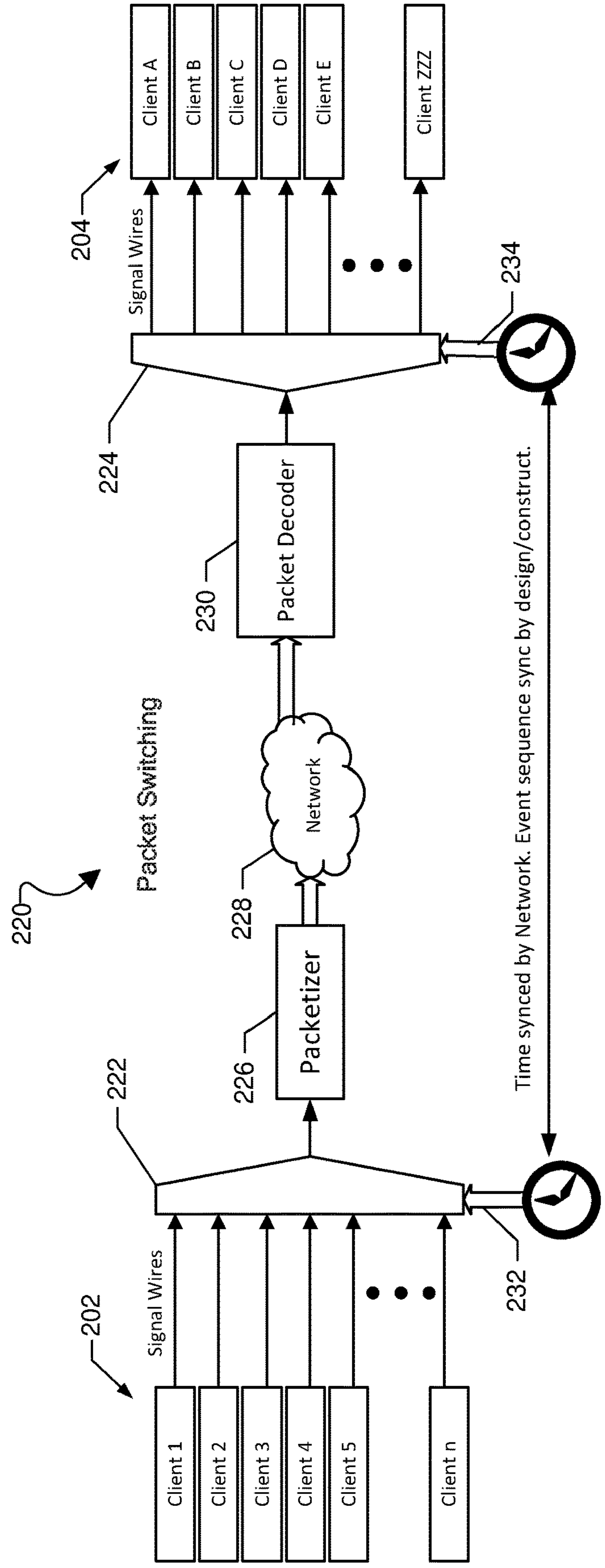
FIG. 2C is a component block diagram illustrating a conventional packet switch NOC.

The other alternative for communicating information between components and subsystems is the use of a packet-switched NOC, an example 220 of which is illustrated in FIG. 2C. As illustrated, a packet-switched NOC 220 may carry information, particularly data and commands, between multiple components 202, 204 by collecting the information (e.g., data or commands) from each component in a data aggregator circuit 222 that is configured to pass the data items one at a time to a packetizer 226 that encodes the data in a packet of information including routing information (e.g., a destination address) and applies the packet to the network 228 (i.e., NOC). A packet decoder 230 connected to the network 228 receives and decodes packets to extract the data or command and routes the data/command via a data segregator circuit 224 to the addressed component or subsystem 202/204. To coordinate the delivery of information from transmitting clients to receiving clients, the network 220 may be time synchronized by clock signals 232, 234.

The use of packet-switching NOCs on and between major components of an SoC enables the transport of messages and data among a large number of components and subsystems on the same network, which uses the wires and silicon area efficiently, providing greater network bandwidth by avoiding underutilization of communication wires, while providing quality of service and supporting different messaging protocols and different classes of traffic. Signals could be communicated between components and subsystems by encoding each signal in a packet addressed to the corresponding receiving component/subsystem. However, using packet switching NOCs for transmitting signals introduces latency and variation in the signal delivery depending on the network congestion and quality of service, requires the network to be packet aware and to have a packetizer and a decoder for each client, requires the clients to transmit information in a packet or packetizable format and a protocol for each service, and the network behavior is difficult to model and verify for large numbers of signals and permutations.

Figure 3A:
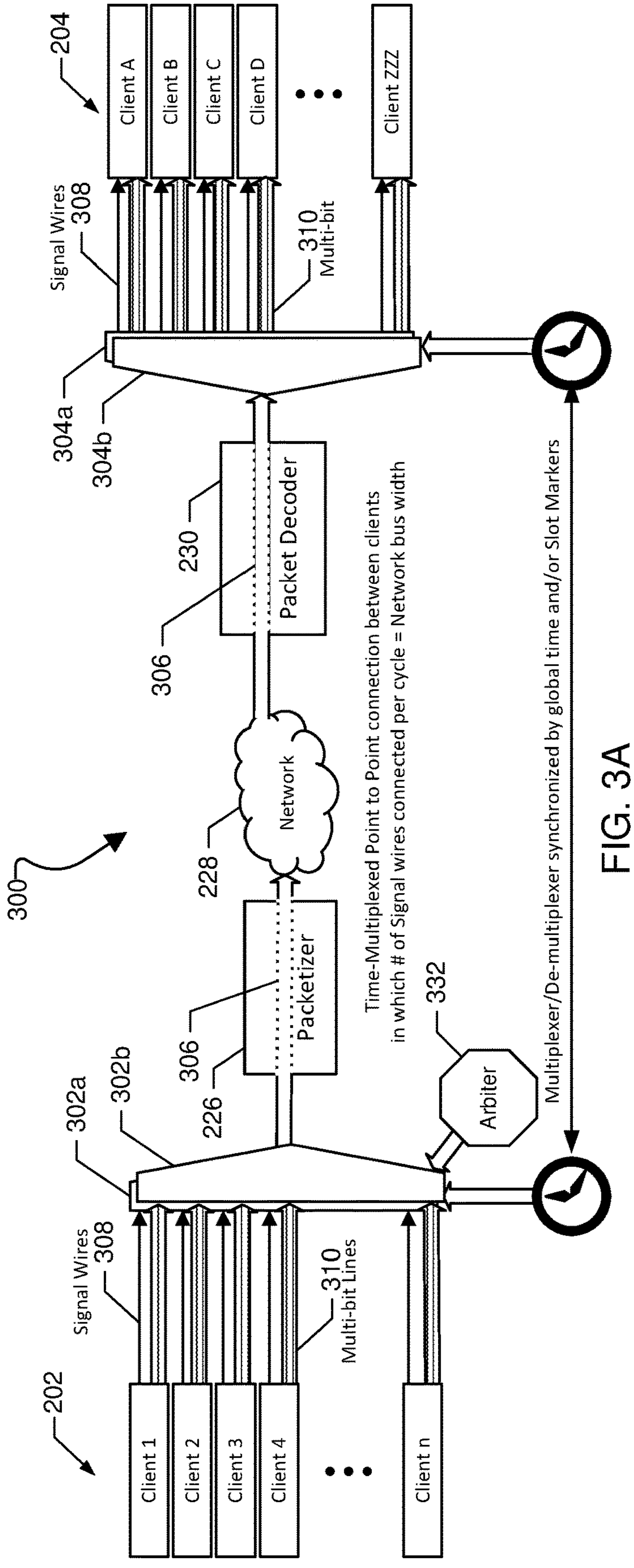
FIG. 3A is a component block diagram illustrating a hybrid NOC that supports both packet-switch communications and multiplexed point-to-point signaling according to some embodiments.
Figure 3B:
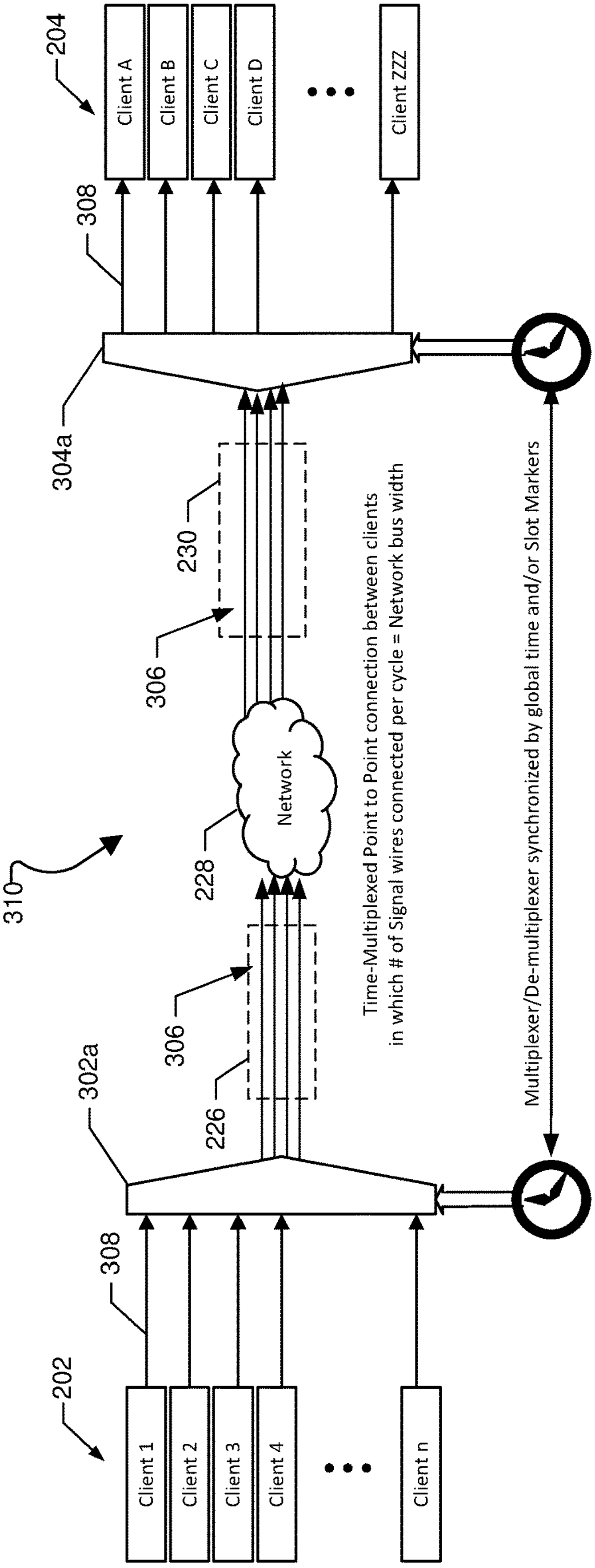
FIG. 3B is a component block diagram illustrating communications of the hybrid NOC illustrated in FIG. 3A during an isochronous signaling window.
Figure 3C:
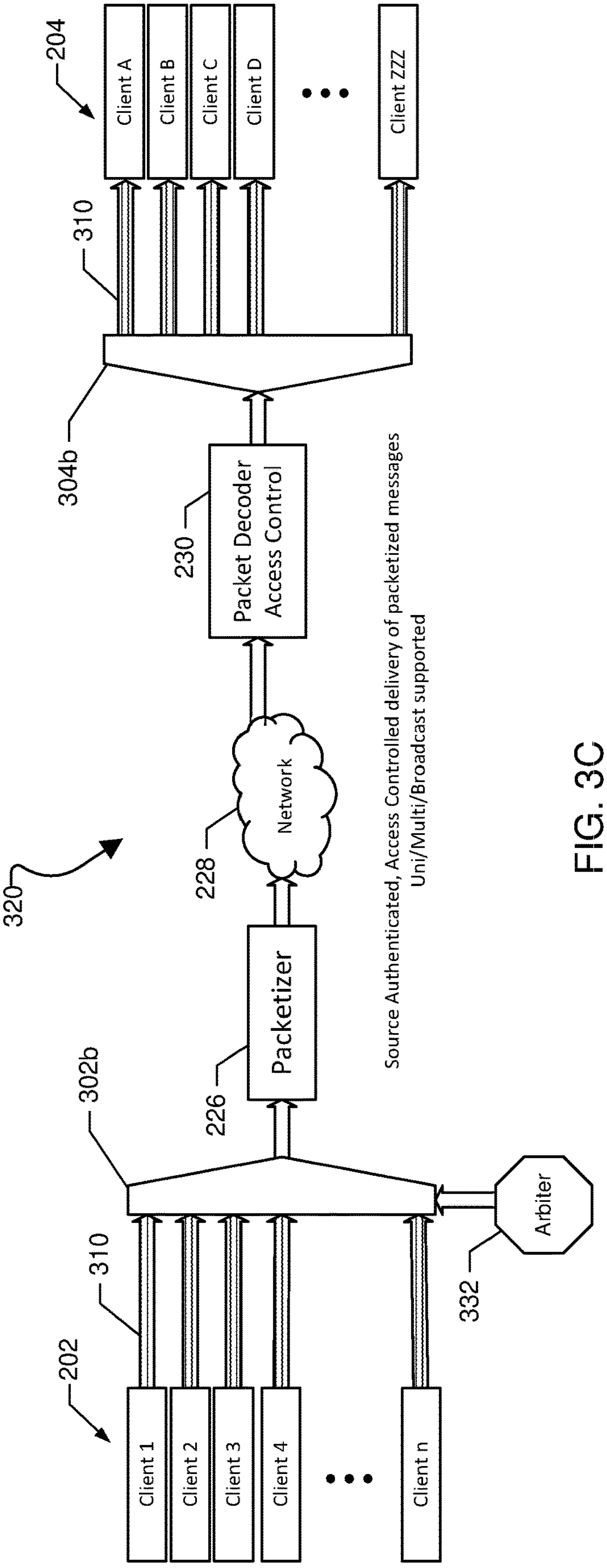
FIG. 3C is a component block diagram illustrating communications of the hybrid NOC illustrated in FIG. 3A during an asynchronous packet switching window.

Various embodiments overcome the disadvantages of direct wire point-to-point connections and the use of packet switching networks for signaling through the use of a hybrid NOC 300 that can transport both signals and messages between components on the SoC, an example of which is illustrated in FIGS. 3A-3C. With reference to FIGS. 1-3C, various embodiments include a network configuration that essentially timeshares a parallel multi-bit line NOC between point-to-point signaling and packet-switching delivery of data and command messages. The hybrid NOC 300 communicates signals and messages during time slots, with each timeslot divided into an isochronous signal delivery interval or window and an asynchronous packet delivery interval window. To ensure synchronization, time markers 232, 234 may be provided to network components to indicate when to switch between a circuit-switching signal delivery mode and a packet-switching data/command packet delivery mode.

Referring to FIG. 3A, circuitry components of a hybrid NOC 300 may include a multiplexer 302*a* and an aggregator 302*b* coupled to a plurality of component or subsystem clients 202 (i.e., client 1 to client n), a demultiplexer 304*a* and a segregator 304*b* coupled to another plurality of component or subsystem clients 204 (i.e., client A to client ZZZ), a network 306 of a plurality of wires, a packetizer 226, a packet decoder 230, and an arbiter 332 coupled to the aggregator 302*b*. The components of the hybrid NOC 300 are configured to switch between signal circuit switching and data/command packet switching modes. The plurality of component or subsystem clients 202, 204 may be coupled to the multiplexer 302*a* and demultiplexer 304*a* by individual signal wires 308, and at least some of the plurality of component or subsystem clients 202, 204 may be coupled to the aggregator 302*b* and segregator 304*b* by multi-bit lines 310 for communicating multiple bits of commands or data in parallel for connection to the packetizer 226 or packet decoder 230. Global time signals and/or slot marker signals may be provided to the multiplexer 302*a* and demultiplexer 304*a* to synchronize multiplexing/demultiplexing signals during isochronous signaling windows and to multiple components of the hybrid NOC 300 to coordinate switching of functionality between isochronous signaling and asynchronous packet transmission windows. The arbiter 332 may select and indicate to the aggregator 302*b* individual clients (i.e., component or subsystem) among the clients served by the aggregator for communicating packetized data or command over the network 306 at specific times during asynchronous packet transmission windows. The arbiter 332 may be configured during the design phase with component/subsystem priority settings (e.g., in a table) that the arbiter may use at run time to indicate to the aggregator 302*b* which clients to prioritize for use of the NOC for packet transmissions during each packet transmission window. In some embodiments, the arbiter 332 may be configured to receive information (e.g., from the operating system) regarding priorities for client packet transmissions based on applications and background operations executing in the SOC, and use such dynamic priority settings to indicate to the aggregator 302*b* which clients to prioritize for use of the NOC for packet transmissions during each packet transmission window.

In some embodiments, the hybrid NOC 300 may incorporate a multiplexer 302*a* and demultiplexer 304*a* (as described with reference to FIG. 2B) that are separate from a data aggregator circuit 302*b* and data segregator circuit 304*b* (and possibly different from the aggregator 222 and segregator 224 described with reference to FIG. 2B), with the operations of each depending on whether the NOC is in the isochronous signal transfer mode or asynchronous packet transfer mode. In such embodiments, the multiplexer 212 and the data aggregator circuit 304*b* may include temporary storage or buffers to buffer signals received during packet transfer intervals and buffer data and commands received during signal transfer intervals, respectively.

In some embodiments, the functionality of the multiplexer and the aggregator circuits may be implemented in a combined multiplexer/aggregator circuit 302 that is configured to perform signal multiplexing and data/command buffering in the signal transfer mode and perform signal buffering and data/command transfer to the packetizer 226 in the packet transfer mode, such as controlled by the arbiter 332. Similarly, in some embodiments, the functionality of the demultiplexer and the segregator circuits may be implemented in a combined demultiplexer/segregator circuit 304 that is configured to perform signal demultiplexing in the signal transfer mode and receive data and commands from the packet decoder 230 and deliver the data/command to the addressed component or subsystem 204 in the packet transfer mode.

FIG. 3B illustrates wire connections of the hybrid NoC 310 during an isochronous signal transfer interval or window. In this mode, a signal from a component or subsystem client 202 received by a multiplexer 302*a* (e.g., 212) is transmitted over one of the bit lines 306 of the network 228, and the signal is received and routed to a corresponding receiving component or subsystem client 204 by a demultiplexer 304*a* (e.g., 214). Thus, signals bypass the packetizer 226 and packet decoder 230 during isochronous signal transfer intervals. For ease of illustration, only four network wires/conductors 306 are shown in FIG. 3B. However, NoCs may include many more wires/conductors to support parallel communication of bits to support high data rates, such as 8, 16, 32, or more parallel wires. During each isochronous signal transfer interval or window, some or all of the NoC wires 306 may be used during each clock cycle to transmit signals from multiple transmitting clients 202 to multiple receiving clients 204.

During the signaling interval or window, global time signals applied to the multiplexer 302*a* and demultiplexer 304*a* ensure that signals from each transmitting client 202 applied to wires 306 of the network by the multiplexer are routed to the correct receiving client 204. As described in more detail with reference to FIGS. 5A-5E, the selection of one of the network wires 306 to carry a signal from one of the transmitting clients 202 to a particular receiving client 204 may be determined during the SoC design process and preprogrammed into the multiplexer 302*a* and demultiplexer 304*b*. As the isochronous signal transfer interval or window may be long enough to encompass several clock cycles, this programming of the multiplexer 302*a* and demultiplexer may be for each of the clock cycles during each signaling window. Further, the preprogramming of the multiplexer 302*a* and demultiplexer may be extended to multiple signaling windows to support connecting every transmitting client 202 to one or more receiving clients 204. Through programming of the multiplexer 302*a* and demultiplexer 304 during the SoC design phase, many of the necessary signal connections between clients 202, 204 may be routed through the NoC 310, eliminating the need for dedicated wires between the clients. In some embodiments, the packet transfer interval may be adjusted during the design phase or during operation to meet command and data communication requirements for latency and bandwidth in the SoC. In some embodiments, the signal transfer interval may be adjusted during the design phase or during operation based on signaling latency and bandwidth requirements in the SoC.

During the signaling interval or window, commands or data received from transmitting clients 202 by the multiplexer 302*a* may be stored temporarily or buffered until the start of the asynchronous packet transfer interval or window.

FIG. 3C illustrates wire connections of the hybrid NoC 320 during the asynchronous packet transfer interval or window. During this interval, a data aggregator circuit 302*b* receives (and buffers if necessary) data and commands from multiple components and subsystem clients 202, and provides the data or commands one at a time to a packetizer 226 that packetizes the information with routing information (e.g., an address or designation for the destination client) and applies the packets to the network 228. At the same time, a packet decoder 230 receives packets from the network 228, decodes the packets to extract, and routes the data/command via a data segregator circuit 304*b* to the addressed component or subsystem client 204. Data and commands may be communicated from transmitting clients 202 over multi-bit connections 310 to the data segregator circuit 304*b*, and to the receiving clients 204 over multi-bit connections 310 to the data segregator circuit 304*b*.

To arbitrate the application of command and data packets to the NoC 320, the data segregator circuit 304 may be controlled by an arbiter 332. Such an arbiter 332 may select commands or data from a buffer for transmission according to priorities and/or order of receipt from transmitting clients 202, and schedule their release to the packetizer 226. The arbiter 332 may be programmed during the SoC design stage to implement transmission priorities as appropriate to support operations of the different components and subsystems of the SoC. For example, commands or status information from some clients may have restrictive latency requirements (e.g., minimum transmission delay tolerances) for which the arbiter 332 may be programmed to give first priority for transmission on the NoC 320. In contrast, some data from other clients may have no latency requirements, for which the arbiter 332 may be programmed to schedule transmission on the NoC 320 when there are no higher priority packets to transmit.

In various embodiments, the packetizer 226 may be configured to support unicasting of information by addressing packets from one client 202 to a single receiving client 204, support multicasting by addressing packets from one client 202 to multiple receiving clients 204, and/or support broadcasting by addressing packets from one client 202 to all (or most) receiving clients 204.

During the asynchronous packet transfer interval or window, signals received via wires 308 from transmitting clients 202 by the multiplexer 302*a* may be stored temporarily or buffered until the start of the next isochronous signaling interval or window.

By combining circuit switch technologies with packet switch technologies through time division of communication time slots, the bit lines of the NOC data buses using time-sharing methods in various embodiments may reduce the number of wires and the physical design challenges of signal transport.

Figure 4:
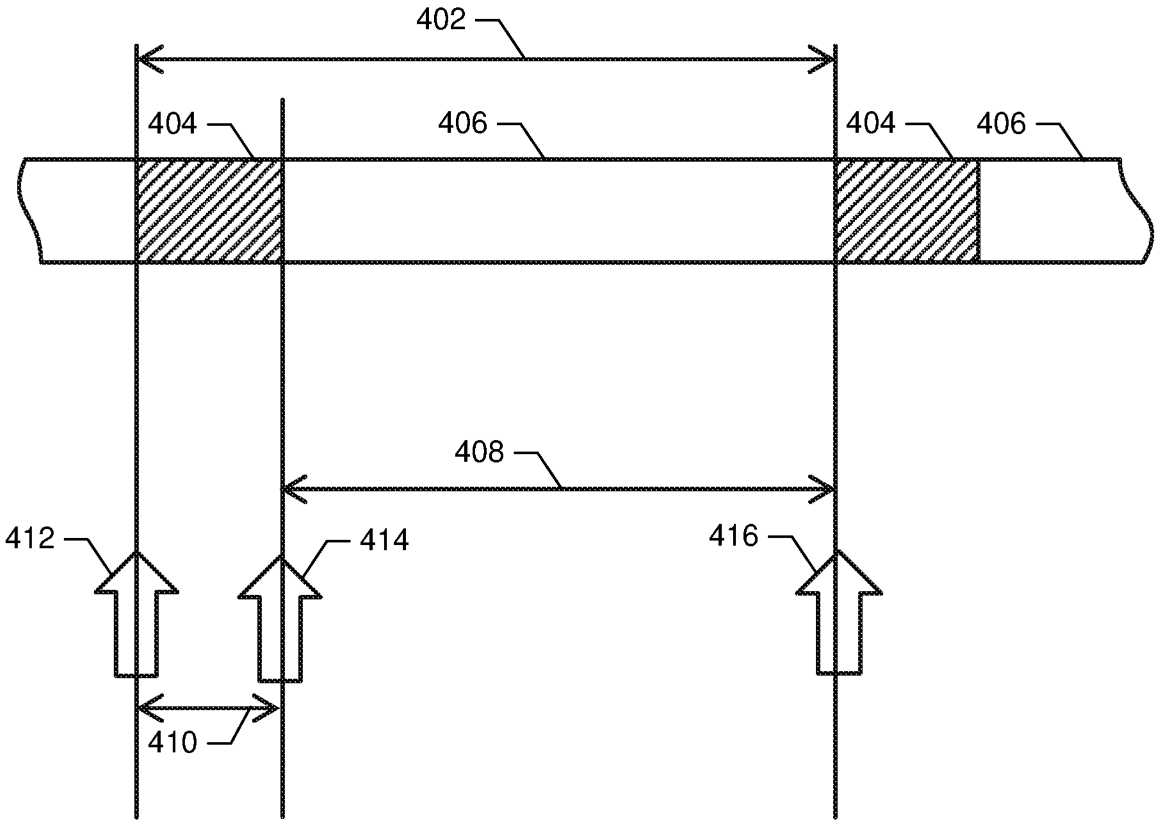
FIG. 4 is an illustration of a hybrid NOC communication time slot including a signal transfer interval and a packet transfer interval according to various embodiments.

FIG. 4 illustrates one network communication time slot 402 that may be used in various embodiments. With reference to FIGS. 1-4, each network communication time slot 402 may be of a predetermined duration, such as a set number of clock cycles (e.g., N cycles). The duration and number of clock cycles in network communication time slots may be a matter of design selection based on the quantity and latency requirements of the signaling and data/command communications required for each major component or subsystem in the SoC. As a non-limiting example, one network communication time slot 402 may encompass 128 clock cycles (i.e., N=128) of 5 ns each for a duration of 640 ns.

To accommodate both point-to-point signaling and data/command packet transmissions, each network communication time slot 402 may be divided into a signal transfer interval 404 of a set duration 410 (e.g., of K cycles) followed (or preceded) by a packet transfer interval 406 of a different set duration 408 (e.g., of M cycles). As described, during the signal transfer interval 404, the bit wires of the NOC are used for communicating signals between components and subsystems (i.e., clients) using circuit switching to connect individual signaling components/subsystems to selected bit wires of the NOC at time instances synchronized with a demultiplexer circuit send signals to the correct receiving component/subsystem. Also as described, during the packet transfer interval, the NOC is used to transmit packetized data or commands from transmitting components and subsystems to addressed components and subsystems. As a non-limiting example, the signal transfer interval 404 may encompass 16 clock cycles of 5 ns each for a total interval of 80 ns, and the packet transfer interval 406 may encompass 112 cycles of 5 ns each for a total interval of 560 ns.

To synchronize the transitions of network circuitry from the signal transfer mode to the packet transfer mode, the network may be time-aware and provide clock signals to the network multiplexer/demultiplexer, data/command receiver, and packetizer/depacketizer circuits in the form of slot boundary marker signals 412, 416 and cycle termination marker signals 414 for signaling the start and stop of signal transfer and packet transfer intervals While FIG. 4 illustrates the signal delivery interval occurring before the packet delivery interval, this is merely for illustrative purposes as communication time slot duration 402 could be defined as beginning at the start of a packet delivery interval and ending with the conclusion of the subsequent signal delivery interval 404.

Figure 5A:
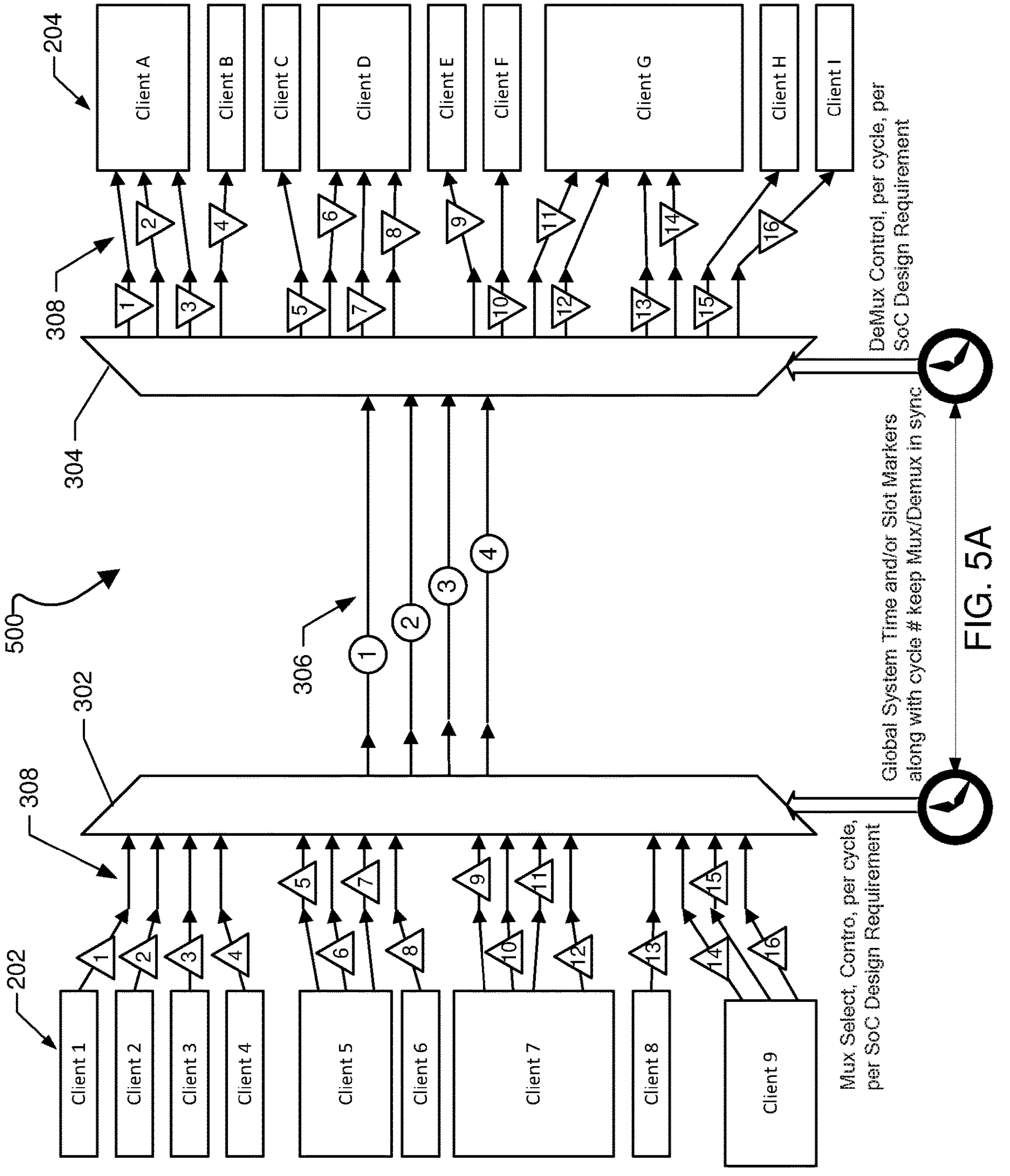
FIG. 5A is a notional block diagram illustrating examples of signal connections between client devices via a hybrid NOC according to various embodiments.

FIG. 5A provides a further illustration of wire connections within a hybrid NoC 500 and FIGS. 5B-5E illustrate connections of individual signals from transmitting clients 202 via individual wires 306 of the NoC during each of four signaling cycles within a single isochronous signaling window. For illustration purposes only, FIGS. 5A-5E show an embodiment in which the signal multiplexing and message aggregation functions are performed by a combined multiplexer/aggregator module 302 and signal demultiplexing and message segregating functions are performed by a combined demultiplexer/segregator 304. For purposes of simplifying illustrations, only nine transmitting and receiving clients 202, 204 with only 16 associated signal wires 308 are shown, with signals connected to only four network wires 306. In a typical implementation, far more component and subsystem clients 202, 204, signal wires 308, and network wires 306 may be employed. Also, to simplify the description, transmitting clients 202 and receiving clients 204 are identified with different labels; however, in a typical implementation, component and subsystem clients may both transmit and receive signals using the same hybrid NoC 500. For example, transmitting client 1 may be the same as receiving client H, and transmitting client 7 may be the same as receiving client G.

FIGS. 5B-5E illustrate how pre-programming of the multiplexer 302 and demultiplexer 304 support routing of signals from transmitting clients to receiving clients 204 via individual NoC wires 306 through a series of four cycles. For ease of reference, the signal wires from transmitting clients 202 are labeled with numbered triangles, the signal wires to receiving clients 204 are labeled with numbered inverted triangles, and network wires 306 are labeled with numbered circles.

Figure 5B:
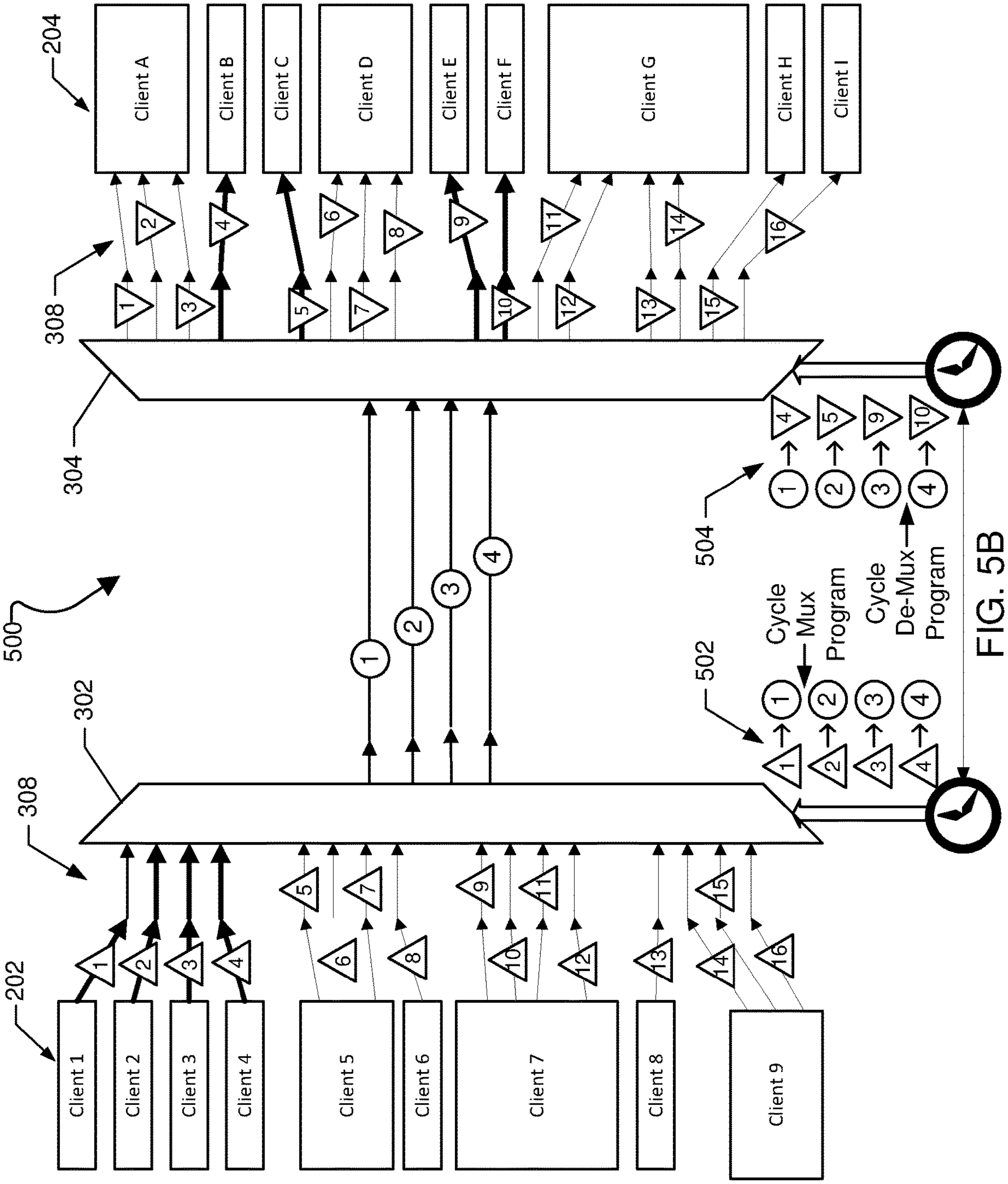
FIGS. 5B-5E are notional block diagrams illustrating examples of signal connections via the hybrid NOC during each of four signaling cycles according to some embodiments.

FIG. 5B illustrates an example of multiplexer and demultiplexer programming and the resulting wire connections established during a first clock cycle of a signaling window. Specifically, FIG. 5B illustrates an example in which during the first clock cycle the multiplexer 302 is programmed 502 to connect the first four signal wires from clients 1-4 to each of the four network wires. Thus, the multiplexer 302 connects the signal from client 1 to the first network wire (circle-1), connects the signal from client 2 to the second network wire (circle-2), connects the signal from client 3 to the third network wire (circle-3), and connects the signal from client 4 to the fourth network wire (circle-4). The illustrated example also shows that the demultiplexer 304 is programmed 504 to connect the signal conveyed by the first network wire (circle-1) to the fourth signal wire 308 (inverted triangle 4) to signal client B, connect the signal conveyed by the second network wire (circle-2) to the fifth signal wire 308 (inverted triangle 5) to signal client C, connect the signal conveyed by the third network wire (circle-3) to the ninth signal wire 308 (inverted triangle 9) to signal client E, and connect the signal conveyed by the fourth network wire (circle-4) to the tenth signal wire 308 (inverted triangle 10) to signal client F.

Figure 5C:
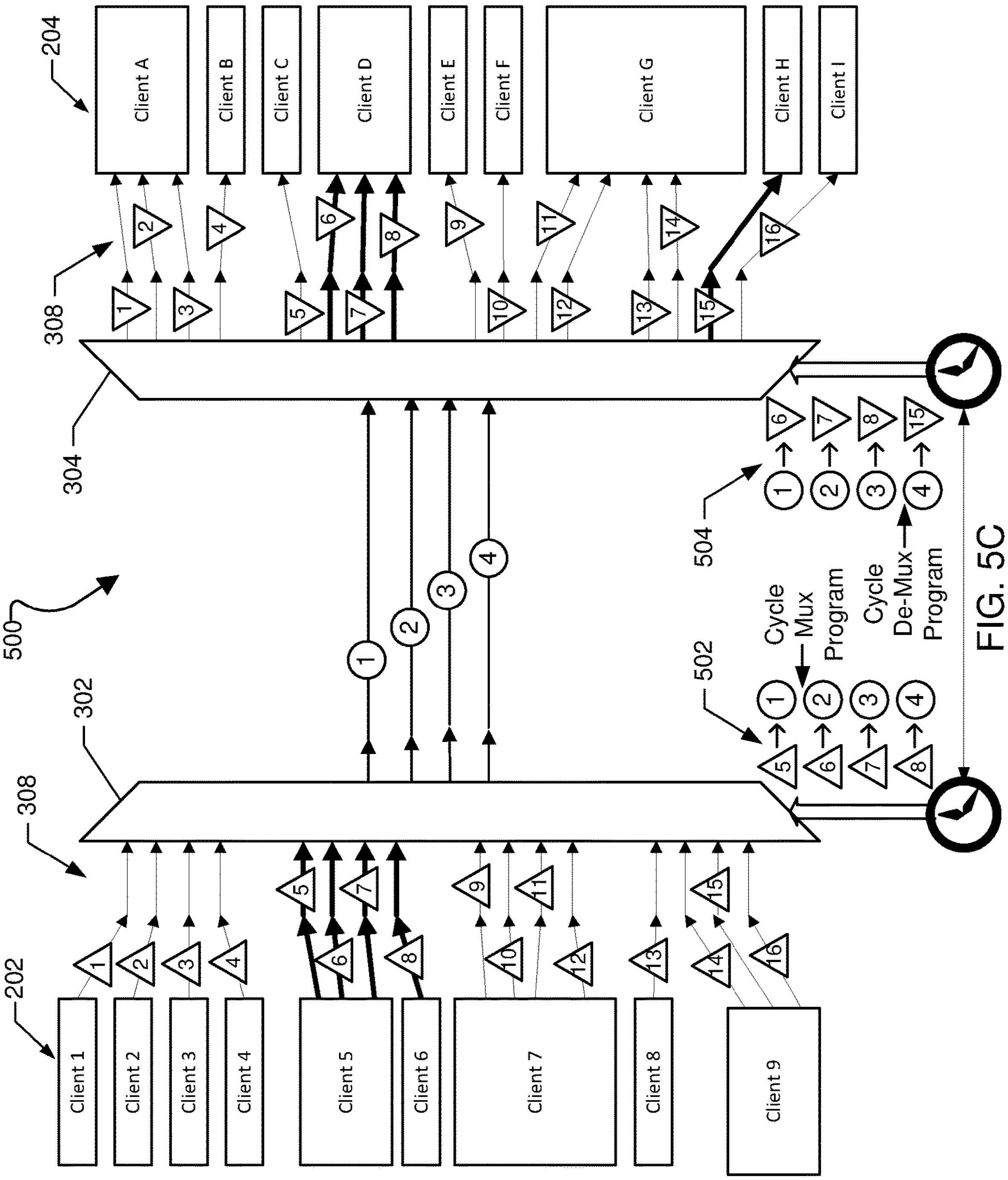

FIG. 5C illustrates an example of multiplexer and demultiplexer programming, as well as the connected wires during a second clock cycle of a signaling window. Specifically, FIG. 5C illustrates an example in which during the second clock cycle the multiplexer is programmed 502 to connect the fifth through eighth signal wires from clients 5 and 6 to each of the four network wires. Thus, the multiplexer 302 connects the signal from the first wire from client 5 (i.e., triangle 5) to the first network wire (circle-1), connects the signal from the second wire from client 5 (i.e., triangle 6) to the second network wire (circle-2), connects the signal from the third wire from client 5 (i.e., triangle 7) to the third network wire (circle-3), and connects the signal from the wire of client 6 (i.e., triangle 8) to the fourth network wire (circle-4). The example also shows that the demultiplexer 304 is programmed 504 to connect the signal conveyed by the first network wire (circle-1) to the sixth signal wire 308 (inverted triangle 6) to signal client D, connect the signal conveyed by the second network wire (circle-2) to the seventh signal wire 308 (inverted triangle 7) to signal client D, connect the signal conveyed by the third network wire (circle-3) to the eighth signal wire 308 (inverted triangle 8) to signal client D, and connect the signal conveyed by the fourth network wire (circle-4) to the fifteenth signal wire 308 (inverted triangle 15) to signal client H.

Figure 5D:
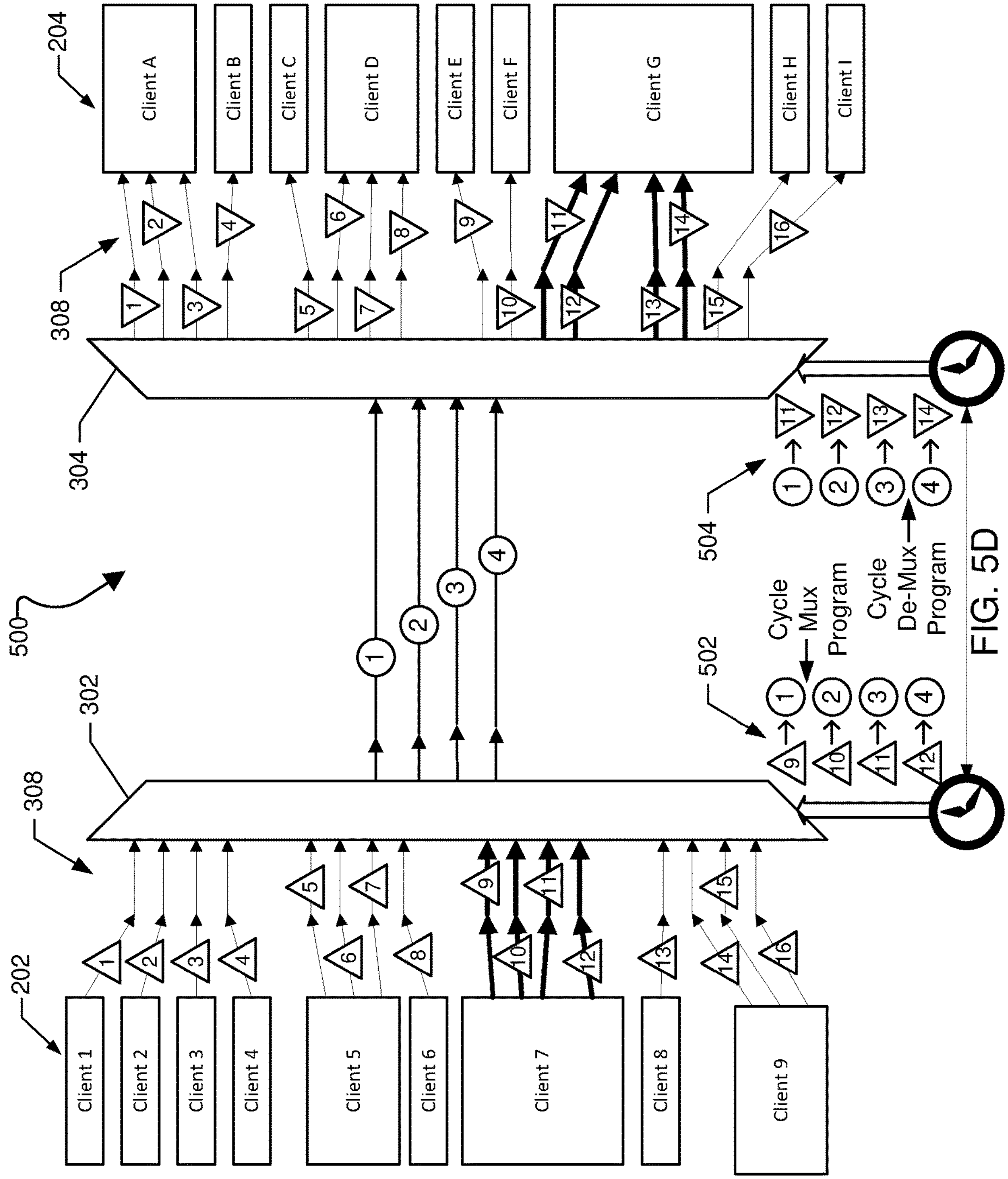

FIG. 5D illustrates an example of multiplexer and demultiplexer programming, as well as the connected wires during a third clock cycle of a signaling window. Specifically, FIG. 5D illustrates an example in which during the third clock cycle the multiplexer is programmed 502 to connect the four signal wires from client 7 to each of the four network wires. Thus, the multiplexer 302 connects the signal from the first wire of client 7 (i.e., triangle 9) to the first network wire (circle-1), connects the signal from the second wire of client 7 (i.e., triangle 10) to the second network wire (circle-2), connects the signal from the third wire of client 7 (i.e., triangle 11) to the third network wire (circle-3), and connects the signal from the fourth wire of client 7 (i.e., triangle 12) to the fourth network wire (circle-4). The example also shows that the demultiplexer 304 is programmed 504 to connect the signal conveyed by the first network wire (circle-1) to the eleventh signal wire 308 (inverted triangle 11) to signal client G, connect the signal conveyed by the second network wire (circle-2) to the twelfth signal wire 308 (inverted triangle 12) to signal client G, connect the signal conveyed by the third network wire (circle-3) to the thirteenth signal wire 308 (inverted triangle 13) to signal client G, and connect the signal conveyed by the fourth network wire (circle-4) to the fourteenth signal wire 308 (inverted triangle 14) to signal client G.

Figure 5E:
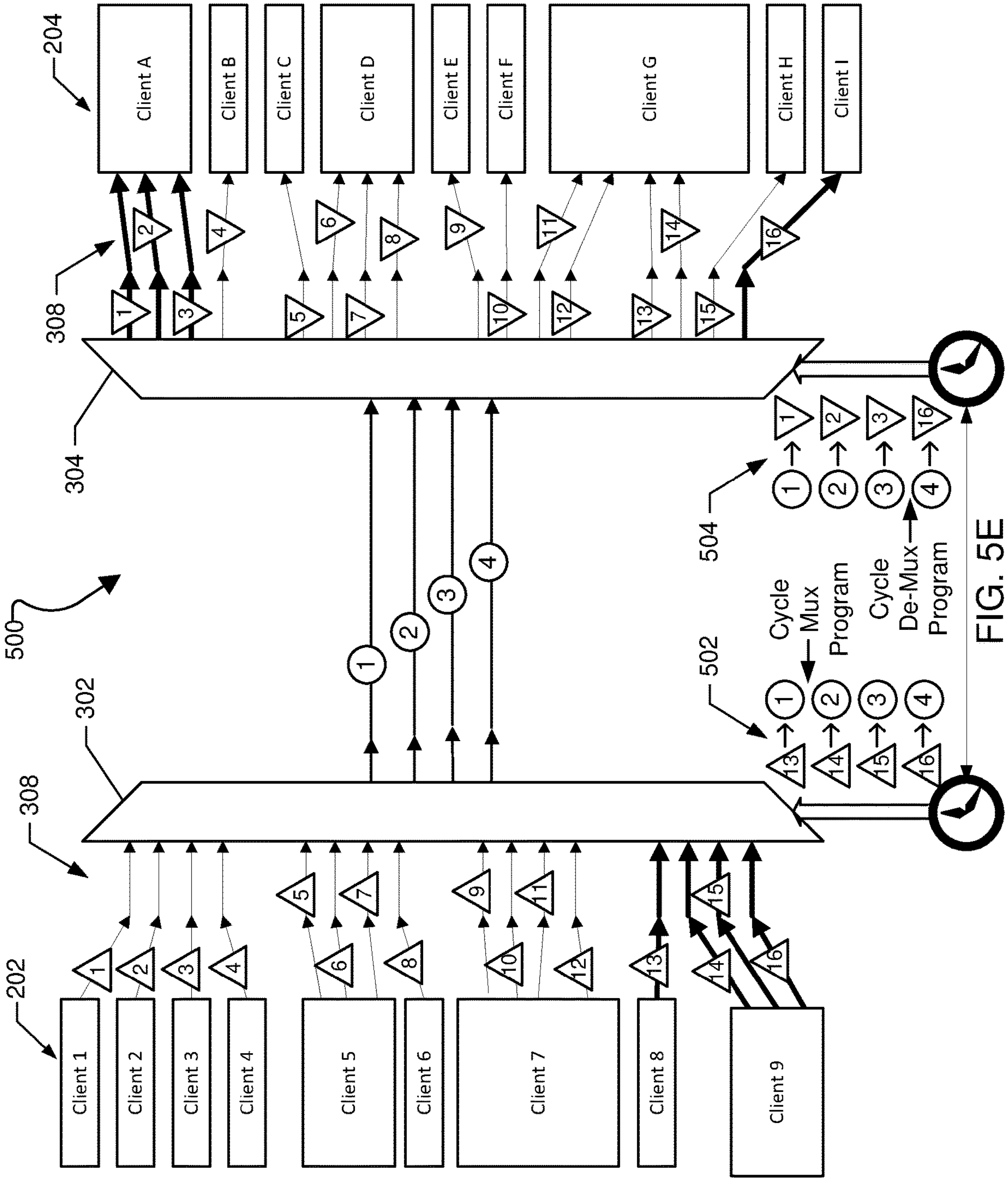

FIG. 5E illustrates an example of multiplexer and demultiplexer programming, as well as the connected wires during a first clock cycle of a signaling window. Specifically, FIG.

5E illustrates an example in which during the first clock cycle the multiplexer is programmed 502 to connect the signal wires from clients 8 and 9 to each of the four network wires. Thus, the multiplexer 302 connects the signal from client 8 (i.e., triangle 13) to the first network wire (circle-1), connects the first signal from client 9 (i.e., triangle 14) to the second network wire (circle-2), connects the signal from second wire of client 9 (i.e., triangle 15) to the third network wire (circle-3), and connects the signal from the third wire of client 9 (i.e., triangle 16) to the fourth network wire (circle-4). The example also shows that the demultiplexer 304 is programmed 504 to connect the signal conveyed by the first network wire (circle-1) to the first signal wire (inverted triangle 1) to signal client A, connect the signal conveyed by the second network wire (circle-2) to the second signal wire (inverted triangle 2) to signal client A, connect the signal conveyed by the third network wire (circle-3) to the third signal wire (inverted triangle 3) to signal client A, and connect the signal conveyed by the fourth network wire (circle-4) to the sixteenth signal wire (inverted triangle 16) to signal client I.

As previously described, the programming of the multiplexer 302 and demultiplexer 304 for each signaling cycle may be established during the design phase of the SoC to provide the signaling required to support operations of the SoC. The programming examples illustrated in FIGS. 5B-5E are notional and not intended to reflect actual or necessary signal connections.

Figure 6:
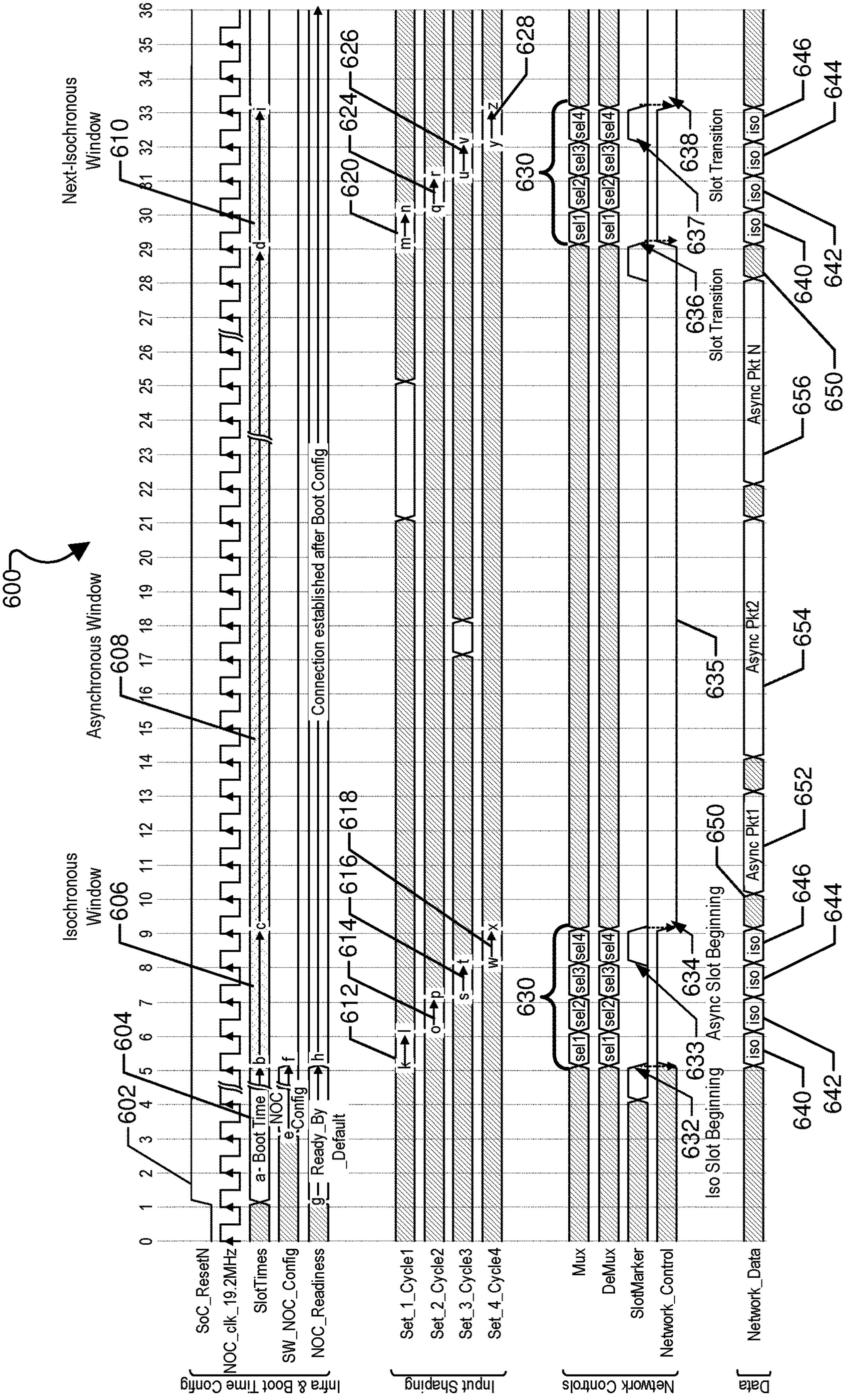
FIG. 6 is a timing diagram of an illustrative example of control signals and the timing of signals and packet transmissions of a hybrid NOC according to some embodiments.

FIG. 6 is a timing diagram of an illustrative example of control signals and timing of signals and packet transmissions for implementing various embodiments. With reference to FIGS. 1-6, the illustrated signaling and state indications are reflective of clock signals, state indications, configurations, multiplex or cycle schedules, and the network controls that enable transmitting information via a hybrid NOC in the form of signals during isochronous windows and data or command packets during asynchronous windows.

FIG. 6 illustrates how after an SoC reset signal 602 (e.g., a high voltage state), the SoC may perform boot operations during a boot time 604. Once the boot operations are completed, the NOC may enter operations during which point-to-point signals are transmitted during isochronous windows 606, 610, and command and data packets are transmitted during asynchronous windows 608 within each communication timeslot (e.g., 402). Operations of the NOC within the timeslots and during isochronous and asynchronous windows are coordinated by signaling and timing controls, illustrative but not limiting examples of which are illustrated in FIG. 6.

As illustrated in FIGS. 5B-5E, the multiplexer 302 and demultiplexer 304 may be programmed as part of the SoC design process to conduct signals between SoC clients on selected individual wires of the NOC in a series of signaling cycles during each signaling isochronous window 606. As described above, the multiplexer 302 and demultiplexer 304 may be preprogrammed to establish different signaling connections in each isochronous signaling cycle, enabling multiple transmitting clients 202 to signal multiple receiving clients 204 during the signaling window. This is illustrated by the input shaping portion of FIG. 6 for a first isochronous window 606, which shows that during a first cycle 612 ("Set_1_Cycle 1") a first set of signals are connected to NOC wires, during a second cycle 614 ("Set_2_Cycle 2") a second set of signals are connected to NOC wires, during a third cycle 616 ("Set_3_Cycle 3") a third set of signals are connected to NOC wires, and during a fourth cycle 618 ("Set_4_Cycle 4") a fourth set of signals are connected to NOC wires. The multiplexer 302 and demultiplexer 304 may be triggered by network control signals 630 to make each of the preprogrammed connections of selected transmitting client signals to NOC wires and NOC wires to respective receiving clients in each cycle. This coordination through preprogramming of the multiplexer and demultiplexer triggering of connections network controls 630 enables several isochronous signals 640, 642, 644, 644 to be communicated over the NOC wires.

This process of triggering the multiplexer 302 and demultiplexer 304 to make each of the preprogrammed connections for each cycle within isochronous windows 606, 610 may be repeated for each communication timeslot (e.g., 402). For example, in the next isochronous window 610, the multiplexer 302 and demultiplexer 304 may be triggered to initiate point-to-point signaling connections 620, 624, 626, 628 in response to the next set of network control signals 630, enabling another series of several isochronous signals 640, 642, 644, 644 to be communicated over the NOC wires.

During the asynchronous window 608 before or after the signaling isochronous window 606, 610 within each communication timeslot, the NOC may be employed to communicate asynchronous command or data packets 652, 654, 656. To coordinate transitioning between isochronous signal communications and asynchronous packet communications, network controls may provide a slot marker signal 632, 636 that indicates the end of an asynchronous window (e.g., 608) and the beginning 634 of an isochronous window (e.g., 606, 610). In response, a network control signal 635 may enable packet communications on the NOC for the duration of the asynchronous window 608 (e.g., by maintaining a low voltage). Similarly, network controls may provide another slot marker signal 633, 637 that indicates the end of an isochronous window (e.g., 606, 610) and the beginning 638 of the next asynchronous window (e.g., 608). In response, the network control signal 635 may disable packet communications for the duration of the next signaling isochronous window 610 (e.g., by maintaining a high voltage).

It is to be understood that the timing durations, number of signaling cycles per isochronous window, and network control signals illustrated in FIG. 6 are intended as representative examples for purposes of describing principles of operations of various embodiments, and are not representative of actual numbers of signals sent, signaling cycles, or network wires used in signaling isochronous windows.

Figure 7A:
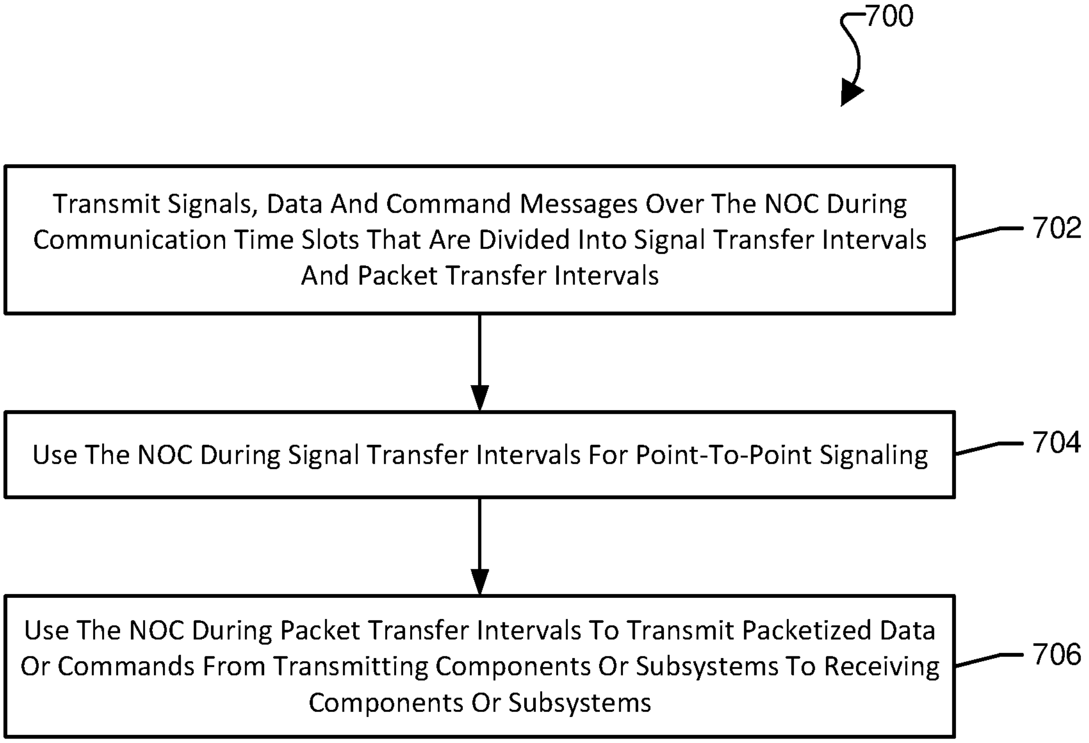
FIG. 7A-7C are process flow diagrams illustrating example methods for implementing communicating data, commands, and point-to-point signaling between hardware components using a hybrid NOC on a SoC according to some embodiments.
Figure 7B:
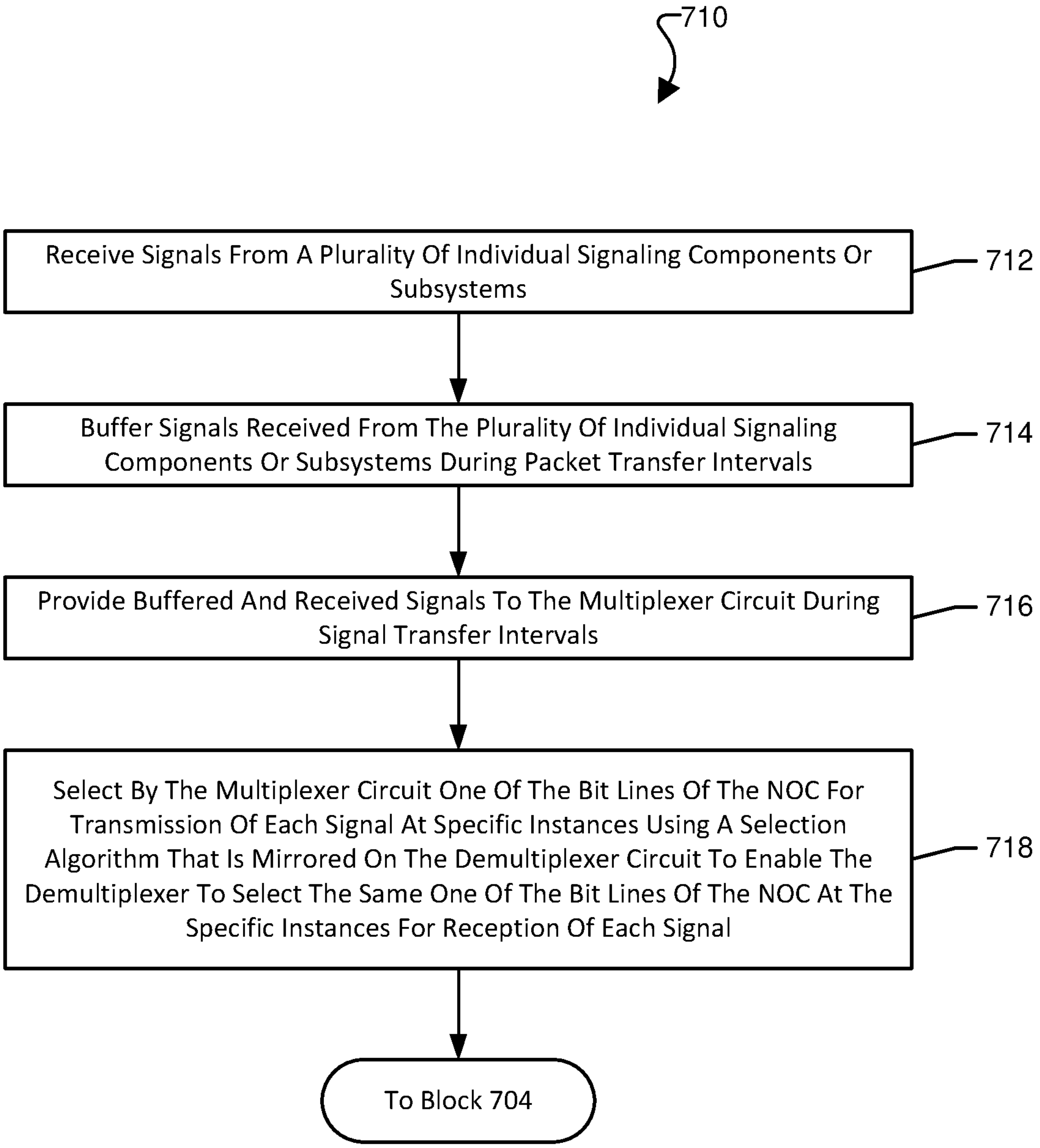
Figure 7C:
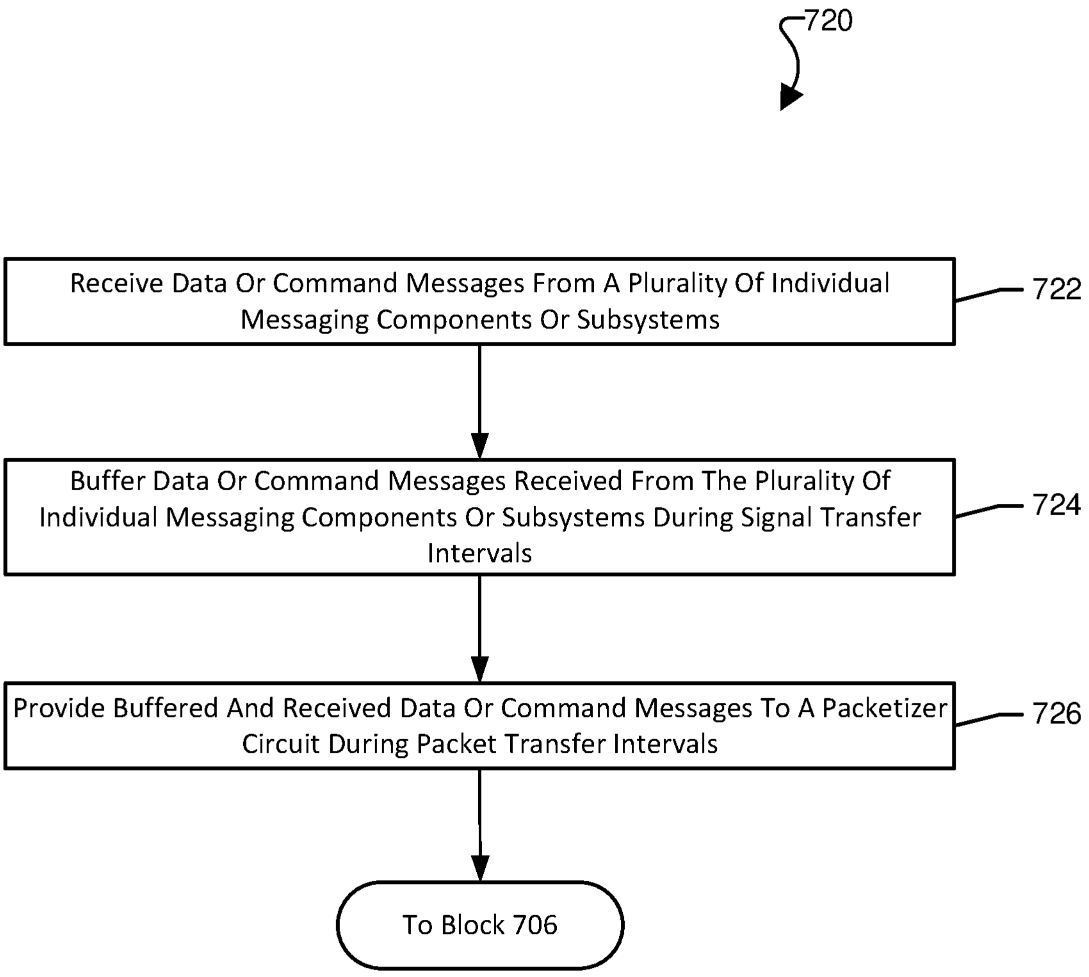

FIGS. 7A-7C illustrate example methods 700, 710, 720 for communicating data, commands, and point-to-point signaling between hardware components using a hybrid multi-bit line NOC on an SoC according to some embodiments. With reference to FIGS. 1-7C, the methods 700, 710, 720 may be implemented in one or more components (e.g., 226, 228, 230, 302, 304, 306, 332) of one or more NOCs (e.g., 300, 310, 320, 500) of an SoC (e.g., 100), in hardware (e.g., 226, 228, 230, 302, 304, 306, 332), in software executing in a processor configured to control the NOC (e.g., 332), or in a combination of a software-configured processor and NOC components. Means for performing functions of the methods 700, 710, 720 may include one or more NOC components (e.g., 226, 230, 302, 304, 306, 332) coupled to a multi-bit data bus (e.g., 228) of the NOC. In order to encompass the alternative configurations enabled in various embodiments, the hardware implementing the method 700 is referred to herein as an "NOC."

Referring to FIG. 7A, in block 702 of method 700, the NOC may perform operations including transmitting signals, data, and command messages over the NOC during communication time slots that are divided into signal transfer intervals and packet transfer intervals. Some embodiments may use a time-aware network clock to provide slot boundary marker signals and cycle marker signals to at least signal receiving and data and command receiving circuits to indicate the start and stop of signal transfer intervals and packet transfer intervals. In some embodiments, the packet transfer interval may be adjusted to meet command and data communication requirements for latency and bandwidth in the SoC. In some embodiments, the signal transfer interval may be adjusted based on signaling latency and bandwidth requirements in the SoC.

In block 704, the NOC may perform operations including using the NOC during signal transfer intervals for point-to-point signaling. As described herein, signals are single bits of information that can be communicated in voltage levels or voltage transitions that are transmitted from one circuit or SoC client to another circuit SoC client to communicate a state, a state change, an interrupt, an activation, a deactivation, etc. In some embodiments, a multiplexer circuit (e.g., 302) of the NOC may select one or more bit lines of the NOC for use in transmitting signals during a current signal transfer interval. In some embodiments, a multiplexer circuit (e.g., 302) of the NOC may connect individual signaling components or subsystems to a selected bit line of the NOC wires for transmitting signals and a demultiplexer circuit (e.g., 304) may connect the selected bit line of the NOC to a corresponding receiving component or subsystem.

In block 706, the NOC may perform operations including using the NOC during packet transfer intervals to transmit packetized data or commands from transmitting components or subsystems to receiving components or subsystems. Packetized data communicated between SoC components and subsystems may include commands, status information, data from sensors, data from calculations, data for communication, etc. As described herein, commands and data received from a transmitting component or subsystem may be packaged in a packet with address information and then transmitted over the NOC.

Referring to FIG. 7B, in block 712 of method 710, the multiplexer circuit of the NOC may perform operations including receiving signals from a plurality of individual signaling components or subsystems. In block 714, the multiplexer circuit of the NOC may perform operations including buffering signals received from the plurality of individual signaling components or subsystems during packet transfer intervals. In block 716, the multiplexer circuit of the NOC may perform operations including providing buffered and received signals to the multiplexer circuit during signal transfer intervals as the NOC performs operations of block 704. In block 718, the multiplexer circuit of the NOC may perform operations including selecting by the multiplexer circuit one of the bit lines of the NOC for transmission of each signal at specific instances using a selection algorithm that is mirrored on the demultiplexer circuit to enable the demultiplexer circuit to select the same one of the bit lines of the NOC at the specific instances for reception of each signal for transmitting signals via the NOC as described.

Referring to FIG. 7C, in block 722 of method 720, NOC components, such as a data aggregator circuit 222 or combined aggregator circuit 302 may perform operations including receiving data or command messages from a plurality of individual messaging components or subsystems. In block 724, the NOC components may perform operations including buffering data or command messages received from the plurality of individual messaging components or subsystems during signal transfer intervals. In block 726, the NOC components may perform operations including providing buffered and received data or command messages to the packetizer circuit during packet transfer intervals as the NOC performs operations of block 706 as described.

Figure 8:
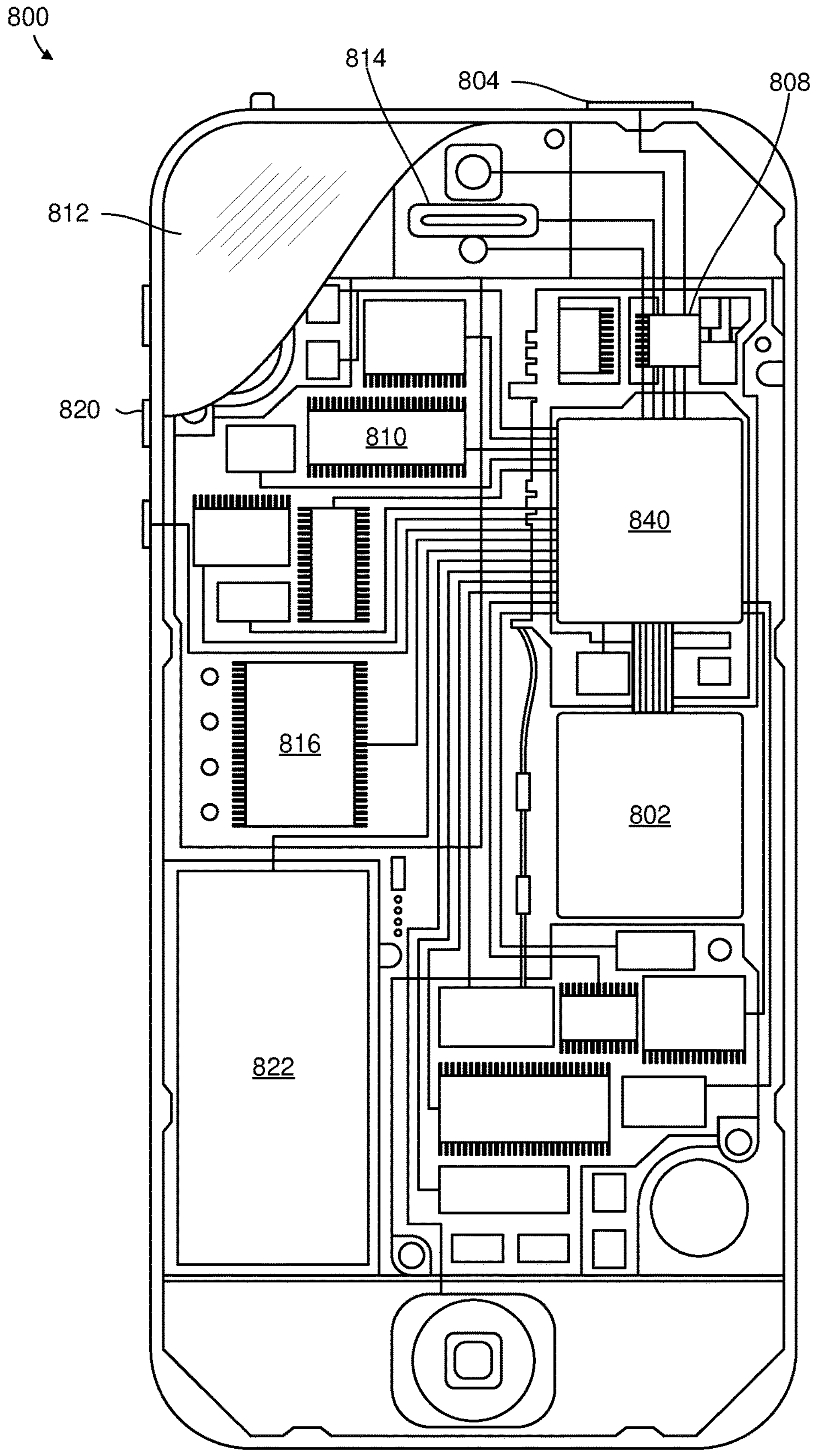
FIG. 8 is a component block diagram illustrating an example mobile computing device suitable for implementing various embodiments.

A system in accordance with various embodiments (including, but not limited to, embodiments described above with reference to FIGS. 1-7C) may be implemented in a wide variety of computing systems including mobile computing devices, an example of which is suitable for use with the various embodiments is illustrated in FIG. 8. The mobile computing device 800 may include a processor 802 coupled to a touchscreen controller 804 and an internal memory 816. The processor 802 may be one or more multicore integrated circuits designated for general or specific processing tasks. The internal memory 816 may be a volatile or non-volatile memory, and may also be secure and/or encrypted memory, unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 810 and the processor 802 may also be coupled to a touchscreen panel 812, such as a resistive-sensing touchscreen, capacitive-sensing touchscreen, infrared-sensing touchscreen, etc. Additionally, the display 812 of the mobile computing device 800 need not have touchscreen capability.

The mobile computing device processor 802 may be coupled to a wide area network transceiver and modem 840 that enables communication via a wide-area cellular network (e.g., a 5G network) via an antenna 804, as well as one or more radio signal transceivers 808 (e.g., Peanut, Bluetooth, ZigBee, Wi-Fi, RF radio) that enable communications with near-field and local area networks. The transceivers 808 and antennae 804 may be used with the above-mentioned circuitry to implement the various wireless transmission protocol stacks and interfaces.

The mobile computing device 800 may also include speakers 814 for providing audio outputs. The mobile computing device 800 may also include a housing 820, constructed of plastic, metal, or a combination of materials, for containing all or some of the components described herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 820 for receiving user inputs.

Figure 9:
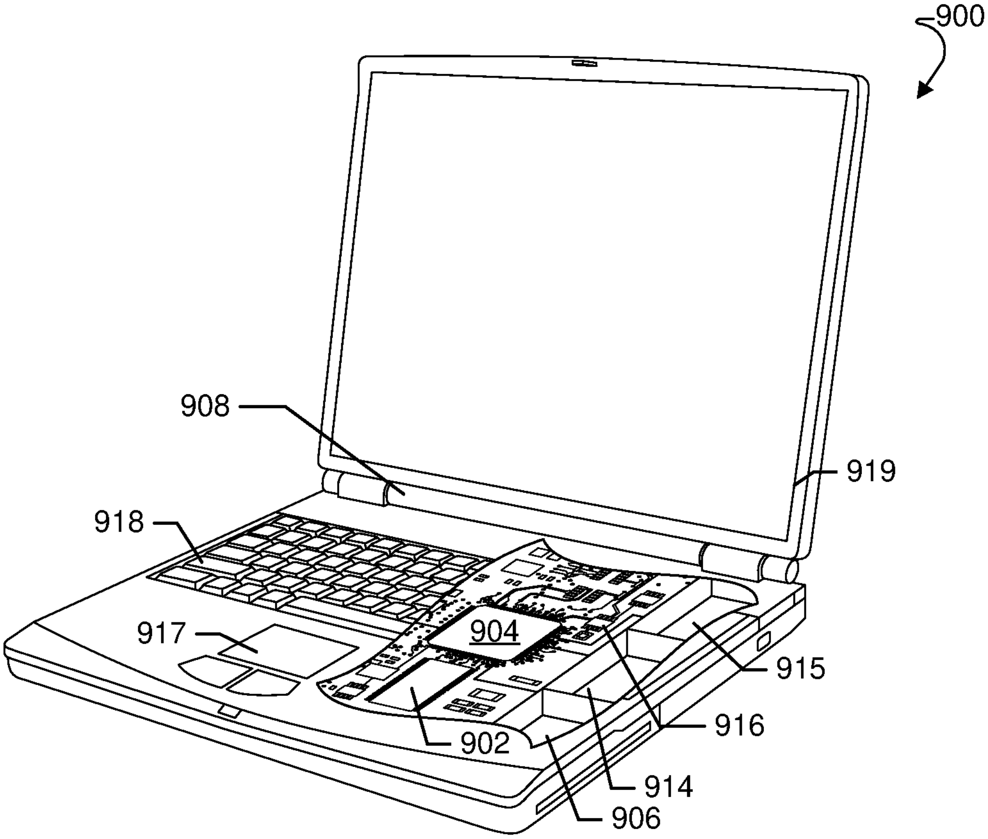
FIG. 9 is a component block diagram illustrating an example mobile computing device suitable for implementing various embodiments.

A system in accordance with the various embodiments (including, but not limited to, embodiments described above with reference to FIGS. 1-7C) may be implemented in a wide variety of computing systems including a laptop computer 900, an example of which is illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 902 coupled to volatile memory 904 and a large capacity nonvolatile memory, such as a disk drive 906 of Flash memory. Additionally, the computer 900 may have one or more antenna 908 for sending and receiving electromagnetic radiation that may be connected to a wireless data link and/or cellular telephone transceiver 916 coupled to the processor 902. The computer 900 may also include a floppy disc drive 914 and a compact disc (CD) drive 915 coupled to the processor 902. In a notebook configuration, the computer housing includes the touchpad 917, the keyboard 918, and the display 919 all coupled to the processor 902. Other configurations of the computing device may include a computer mouse or trackball coupled to the processor (e.g., via a universal serial bus (USB) input) as are well known, which may also be used in conjunction with the various embodiments.

Figure 10:
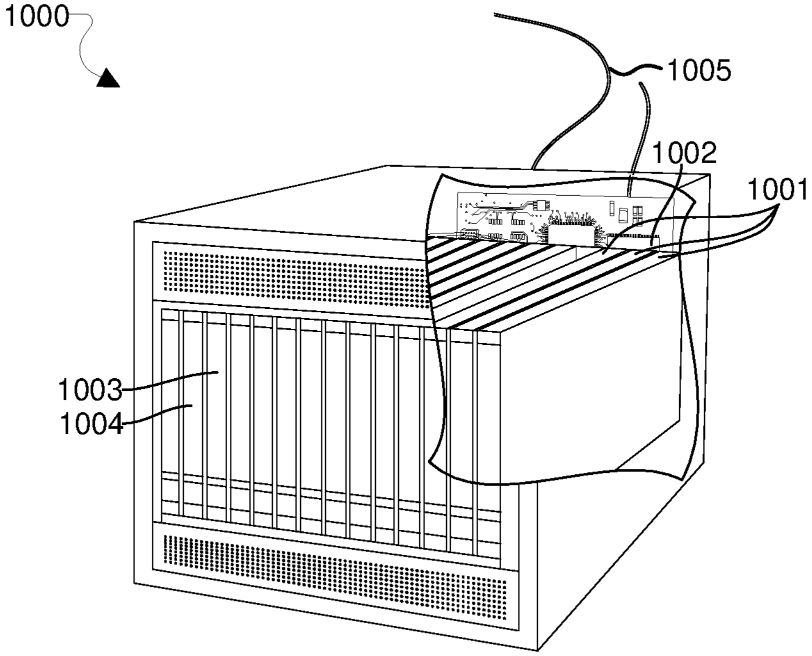
FIG. 10 is a component block diagram illustrating an example general-purpose computing system suitable for implementing various embodiments.

A system in accordance with the various embodiments (including, but not limited to, embodiments described above with reference to FIGS. 1-7C) may also be implemented in fixed computing systems, such as any of a variety of generalized or specialized computing systems, including computing systems that may be implemented in vehicles. An example computing system 1000 is illustrated in FIG. 10. Such a computing system 1000 typically includes one or more multicore processor assemblies 1001 coupled to volatile memory 1002 and a large capacity nonvolatile memory, such as a non-volatile disk drive 1004. The computing system 1000 may include network access ports 1003 coupled to the multicore processor assemblies 1001 for establishing network interface connections with a network 1005, such as a local area network.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices; the example systems, devices, or methods discussed in the following paragraphs implemented by a computing device including a network on chip configured to perform operations of the example methods; the example systems, devices, or methods discussed in the following paragraphs implemented by network on chip circuitry configured to perform operations of the example methods; the example systems, devices, or methods discussed in the following paragraphs including means for performing functions of the example methods; and the example systems, devices, or methods discussed in the following paragraphs implemented as a non-transitory processor-readable storage medium having stored thereon processor-executable instructions configured to cause a processor of a computing device to perform the operations of the example methods.

Example 1. A method for communicating data, commands, and point-to-point signaling between hardware components using a multi-bit line network on chip (NOC) on a system on chip (SoC), including: transmitting signals, data, and command messages over the NOC during communication time slots that are divided into signal transfer intervals and packet transfer intervals; using the NOC during signal transfer intervals for point-to-point signaling; and using the NOC during packet transfer intervals to transmit packetized data or commands from transmitting components or subsystems to receiving components or subsystems.

Example 2. The method of example 1, in which using the NOC during signal transfer intervals for point-to-point signaling includes using a multiplexer circuit to connect individual signaling components or subsystems to a selected bit line of the NOC wires for transmitting signals and using a demultiplexer circuit to connect the selected bit line of the NOC to a corresponding receiving component or subsystem.

Example 3. The method of example 2, further including: receiving signals from a plurality of individual signaling components or subsystems; buffering signals received from the plurality of individual signaling components or subsystems during packet transfer intervals; and providing buffered and received signals to the multiplexer circuit during signal transfer intervals.

Example 4. The method of example 2, further including selecting by the multiplexer circuit one of the bit lines of the NOC for transmission of each signal at specific instances using a selection algorithm that is mirrored on the demultiplexer circuit to enable the demultiplexer circuit to select the same one of the bit lines of the NOC at the specific instances for reception of each signal.

Example 5. The method of any of examples 1-4, in which using the NOC during the packet transfer interval to transmit packetized data or commands from transmitting components or subsystems to receiving subsystems or components includes: receiving data or command messages from a plurality of individual messaging components or subsystems; buffering data or command messages received from the plurality of individual messaging components or subsystems during signal transfer intervals; and providing buffered and received data or command messages to a packetizer circuit during packet transfer intervals.

Example 6. The method of any of examples 1-5, further including using a time-aware network clock to provide slot boundary marker signals and cycle marker signals to at least signal multiplexer, demultiplexer, aggregator, and segregator circuits to indicate the start and stop of signal transfer intervals and packet transfer intervals.

Example 7. The method of any of examples 1-6, further including adjusting the packet transfer interval to meet command and data communication requirements for latency and bandwidth in the SoC.

Example 8. The method of any of examples 1-7, further including adjusting the signal transfer interval based on signaling latency and bandwidth requirements in the SoC.

Example 9. A network-on-chip (NOC) system on a System on Chip (SoC), including: a multi-bit network; an aggregator circuit coupled to the multi-bit network; a packetizer coupled to the aggregator and the multi-bit network; a segregator circuit; a packet decoder coupled to the segregator and the multi-bit network; a multiplexer coupled to the multi-bit network; and a demultiplexer coupled to the multi-bit network; a network coupled between in which: the multiplexer and demultiplexer are configured to use the multi-bit network during signal transfer intervals of communication time slots for point-to-point signaling from transmitting components or subsystems to receiving components or subsystems; and the aggregator circuit and segregator circuit are configured to use the multi-bit network during packet transfer intervals of communication time slots to transmit packetized data or commands from transmitting components or subsystems to receiving components or subsystems.

Example 10. The NOC system of example 9, in which: the multiplexer is configured to use the multi-bit network during signal transfer intervals to connect individual signaling components or subsystems to a selected bit line of the multi-bit network for transmitting signals; and the demultiplexer is configured to connect the selected bit line of the multi-bit network to a corresponding receiving component or subsystem.

Example 11. The NOC system of example 10, further including a buffer within or coupled to the multiplexer that is configured to: receive signals from a plurality of individual signaling components or subsystems; buffer signals received from the plurality of individual signaling components or subsystems during packet transfer intervals; and provide buffered and received signals to the multiplexer during signal transfer intervals.

Example 12. The NOC system of example 10, in which: the multiplexer is further configured to select one of the bit lines of the multi-bit network for transmission of each signal at specific instances using a selection algorithm; and that is mirrored on the demultiplexer is further configured to select the same one of the bit lines of the multi-bit network at the specific instances for reception of each signal using the selection algorithm.

Example 13. The NOC system of any examples 9-12, in which the aggregator is further configured to: receive data or command messages from a plurality of individual messaging components or subsystems; buffer data or command messages received from the plurality of individual messaging components or subsystems during signal transfer intervals; and provide buffered and received data or command messages to a packetizer circuit during packet transfer intervals.

Example 14. The NOC system of any examples 9-13, further including an arbiter module coupled to the aggregator and configured to indicate to the aggregator which component or subsystem to prioritize when transmitting data or command packets during each packet transmission window.

Example 15. The NOC system of any examples 9-14, further including a network clock configured to provide slot boundary marker signals and cycle marker signals to at least signal multiplexer, demultiplexer, aggregator, and segregator circuits to indicate the start and stop of signal transfer intervals and packet transfer intervals.

Example 16. The NOC system of example 15, in which the network clock is further configured to adjust timings of the slot boundary marker signals and cycle marker signals to adjust the packet transfer interval to meet command and data communication requirements for latency and bandwidth in the SoC.

Example 17. The NOC system of example 15, in which the network clock is further configured to adjust timings of the slot boundary marker signals and cycle marker signals to adjust the signal transfer interval based on signaling latency and bandwidth requirements in the SoC.

Computer program code or "program code" for execution on a programmable processor for carrying out operations of various embodiments may be written in a high-level programming language such as C, C++, C#, Smalltalk, Java, JavaScript, Visual Basic, a Structured Query Language (e.g., Transact-SQL), Perl, Python, or various other programming languages. Program code or programs stored on a processor-readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented in hardware circuitry, such as discrete gate or transistor logic, or discrete hardware components, or performed with a general-purpose processor, a digital signal processor (DSP), an application-specific integrated circuit (ASIC), a field programmable gate array (FPGA) or other programmable logic device, as well as any combination thereof designed to perform the functions described herein. A general-purpose processor may be a microprocessor, controller, microcontroller, or state machine. Alternatively, some operations or methods may be performed by circuitry that is specific to a given function.

If implemented in software, the functions of one or more embodiments may be stored as instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for communicating data, commands, and point-to-point signaling between hardware components using a multi-bit line network on chip (NOC) on a system on chip (SoC), comprising:

transmitting signals, data, and command messages over the NOC during communication time slots that are divided into signal transfer intervals and packet transfer intervals;

using the NOC during signal transfer intervals for point-to-point signaling from transmitting components or subsystems to receiving components or subsystems; and using the NOC during packet transfer intervals to transmit packetized data or commands from transmitting components or subsystems to receiving components or subsystems.

2. The method of claim 1, wherein using the NOC during signal transfer intervals for point-to-point signaling comprises using a multiplexer circuit to connect individual signaling components or subsystems to a selected bit line of the NOC wires for transmitting signals and using a demultiplexer circuit to connect the selected bit line of the NOC to a corresponding receiving component or subsystem.

3. The method of claim 2, further comprising:

receiving signals from a plurality of individual signaling components or subsystems;

buffering signals received from the plurality of individual signaling components or subsystems during packet transfer intervals; and providing buffered and received signals to the multiplexer circuit during signal transfer intervals.

4. The method of claim 2, further comprising selecting by the multiplexer circuit one of the bit lines of the NOC for transmission of each signal at specific instances using a selection algorithm that is mirrored on the demultiplexer circuit to enable the demultiplexer circuit to select the same one of the bit lines of the NOC at the specific instances for reception of each signal.

5. The method of claim 1, wherein using the NOC during the packet transfer interval to transmit packetized data or commands from transmitting components or subsystems to receiving subsystems or components comprises:

receiving data or command messages from a plurality of individual messaging components or subsystems;

buffering data or command messages received from the plurality of individual messaging components or subsystems during signal transfer intervals; and providing buffered and received data or command messages to a packetizer circuit during packet transfer intervals.

6. The method of claim 1, further comprising using a time-aware network clock to provide slot boundary marker signals and cycle marker signals to at least multiplexer, demultiplexer, aggregator, and segregator circuits in the NOC to indicate the start and stop of signal transfer intervals and packet transfer intervals.

7. The method of claim 1, further comprising adjusting the packet transfer interval to meet command and data communication requirements for latency and bandwidth in the SoC.

8. The method of claim 1, further comprising adjusting the signal transfer interval based on signaling latency and bandwidth requirements in the SoC.

9. A network-on-chip (NOC) system on a System on Chip (SoC), comprising:

a multi-bit network;

an aggregator circuit coupled to the multi-bit network;

a packetizer coupled to the aggregator and the multi-bit network;

a segregator circuit;

a packet decoder coupled to the segregator circuit and the multi-bit network;

a multiplexer coupled to the multi-bit network; and a demultiplexer coupled to the multi-bit network, wherein:

the multiplexer and demultiplexer are configured to use the multi-bit network during signal transfer intervals of communication time slots for point-to-point signaling from transmitting components or subsystems to receiving components or subsystems; and the aggregator circuit and segregator circuit are configured to use the multi-bit network during packet transfer intervals of communication time slots to transmit packetized data or commands from transmitting components or subsystems to receiving components or subsystems.

10. The NOC system of claim 9, wherein:

the multiplexer is configured to use the multi-bit network during signal transfer intervals to connect individual signaling components or subsystems to a selected bit line of the multi-bit network for transmitting signals; and the demultiplexer is configured to connect the selected bit line of the multi-bit network to a corresponding receiving component or subsystem.

11. The NOC system of claim 10, further comprising a buffer within or coupled to the multiplexer that is configured to:

receive signals from a plurality of individual signaling components or subsystems;

buffer signals received from the plurality of individual signaling components or subsystems during packet transfer intervals; and provide buffered and received signals to the multiplexer during signal transfer intervals.

12. The NOC system of claim 10, wherein:

the multiplexer is further configured to select one of the bit lines of the multi-bit network for transmission of each signal at specific instances using a selection algorithm; and that is mirrored on the demultiplexer is further configured to select the same one of the bit lines of the multi-bit network at the specific instances for reception of each signal using the selection algorithm.

13. The NOC system of claim 9, wherein the aggregator is further configured to:

receive data or command messages from a plurality of individual messaging components or subsystems;

buffer data or command messages received from the plurality of individual messaging components or subsystems during signal transfer intervals; and provide buffered and received data or command messages to a packetizer circuit during packet transfer intervals.

14. The NOC system of claim 9, further comprising an arbiter module coupled to the aggregator and configured to indicate to the aggregator which component or subsystem to prioritize when transmitting data or command packets during each packet transmission window.

15. The NOC system of claim 9, further comprising a network clock configured to provide slot boundary marker signals and cycle marker signals to at least signal multiplexer, demultiplexer, aggregator, and segregator circuits to indicate the start and stop of signal transfer intervals and packet transfer intervals.

16. The NOC system of claim 15, wherein the network clock is further configured to adjust timings of the slot boundary marker signals and cycle marker signals to adjust the packet transfer interval to meet command and data communication requirements for latency and bandwidth in the SoC.

17. The NOC system of claim 15, wherein the network clock is further configured to adjust timings of the slot boundary marker signals and cycle marker signals to adjust the signal transfer interval based on signaling latency and bandwidth requirements in the SoC.

18. A network-on-chip (NOC) system on a System on Chip (SoC), comprising:

means for transmitting signals, data, and command messages over a multi-bit network during communication time slots that are divided into signal transfer intervals and packet transfer intervals;

means for using the multi-bit network during signal transfer intervals for point-to-point signaling from transmitting components or subsystems to receiving components or subsystems; and means for using the multi-bit network during packet transfer intervals to transmit packetized data or commands from transmitting components or subsystems to receiving components or subsystems.

19. The NOC system of claim 18, further comprising:

means for receiving signals from a plurality of individual signaling components or subsystems;

means for buffering signals received from the plurality of individual signaling components or subsystems during packet transfer intervals; and means for providing buffered and received signals to a multiplexer circuit during signal transfer intervals.

20. The NOC system of claim 18, further comprising:

means for receiving data or command messages from a plurality of individual messaging components or subsystems;

means for buffering data or command messages received from the plurality of individual messaging components or subsystems during signal transfer intervals; and providing buffered and received data or command messages to a packetizer circuit during packet transfer intervals.

* * * * *